United States Patent
Kawakami et al.

(10) Patent No.: US 10,185,523 B2
(45) Date of Patent: Jan. 22, 2019

(54) INFORMATION PROCESSING SYSTEM, INFORMATION PROCESSING APPARATUS AND CONTROL METHOD THEREFOR, AND PROGRAM FOR PREVENTING INCONSISTENCY OF A SETTING

(71) Applicant: CANON KABUSHIKI KAISHA, Tokyo (JP)

(72) Inventors: Shuuhei Kawakami, Higashiyamato (JP); Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/675,558

(22) Filed: Aug. 11, 2017

(65) Prior Publication Data
US 2018/0059999 A1 Mar. 1, 2018

(30) Foreign Application Priority Data
Aug. 26, 2016 (JP) ................. 2016-166013

(51) Int. Cl.
*G06F 3/12* (2006.01)
*H04N 1/00* (2006.01)

(52) U.S. Cl.
CPC .......... *G06F 3/1225* (2013.01); *G06F 3/1203* (2013.01); *G06F 3/1236* (2013.01); *G06F 3/1284* (2013.01); *H04N 1/00411* (2013.01); *H04N 1/00464* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2008/0304092 | A1* | 12/2008 | Ebuchi | G06F 3/1204 358/1.13 |
| 2011/0128572 | A1* | 6/2011 | Hosotsubo | G06F 3/122 358/1.15 |
| 2011/0242568 | A1* | 10/2011 | Soga | G06F 3/1204 358/1.13 |
| 2013/0033718 | A1* | 2/2013 | Tsujimoto | G06F 9/453 358/1.13 |
| 2014/0211244 | A1* | 7/2014 | Murakami | G06F 8/61 358/1.15 |
| 2015/0261480 | A1* | 9/2015 | Omura | G06F 3/1231 358/1.13 |
| 2015/0312122 | A1* | 10/2015 | Nakazawa | H04M 1/72561 709/224 |

FOREIGN PATENT DOCUMENTS

| | | |
|---|---|---|
| JP | 2006-40217 A | 2/2006 |
| JP | 2012-105071 A | 5/2012 |

* cited by examiner

*Primary Examiner* — Miya J Williams
(74) *Attorney, Agent, or Firm* — Canon U.S.A., Inc. IP Division

(57) ABSTRACT

A PC changes a setting and the changed setting is stored as a new setting in an information processing apparatus. In the information processing apparatus, a call-up unit that calls up a web browser on a screen reflects the changed new setting in a current setting of an application for web connection, after an instruction to activate the application for web connection and before calling up the web browser on the screen.

9 Claims, 23 Drawing Sheets

FIG. 4
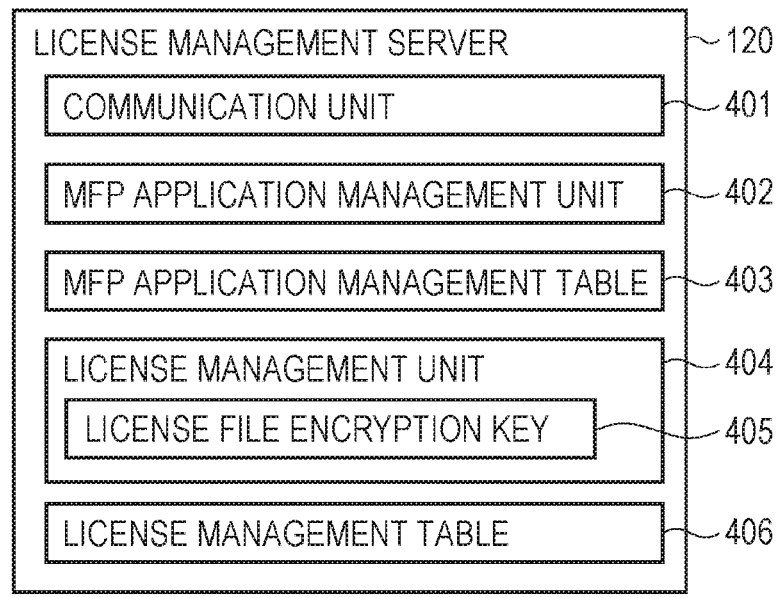
FIG. 5
```
LICENSE ID: LIC002
MFP APPLICATION ID: APP712
DEVICE ID: DEV002
PERIOD OF VALIDITY: 60
ENCRYPTION COMMON KEY OF MFP APPLICATION: WasiIDcQR6dYj......
```
FIG. 6
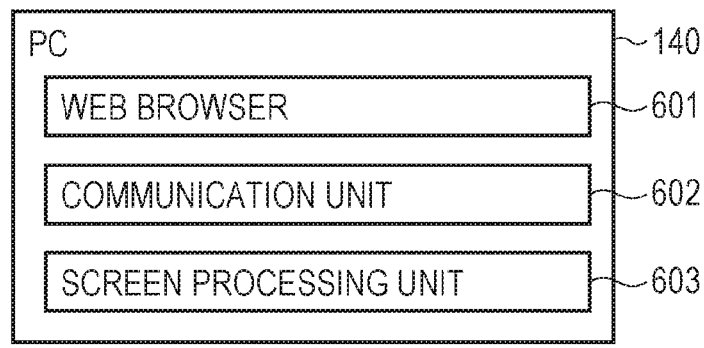

FIG. 9A

- 901 — MFP APPLICATION ID: APP713
- 902 — APPLICATION NAME: send to my system
  ...

FIG. 9B

- 911 — MFP APPLICATION ID: APP711
- 912 — APPLICATION NAME: WebApp01
- 913 — FRONT PAGE URL: http://www.canon.com/myportal?app=webapp01
- 914 — CONTEXT ROOT URL: http://www.canon.com/webapp01
- 915 — SSB SETTING: cookie=on, address_bar=off, cache=off, warn_not_exist_rootcert=on
- 916 — DEVICE INFORMATION LIST: user_id, device_id, device_model, encrypt_pdf, print_service_ver
  ...

FIG. 9C

- 911 — MFP APPLICATION ID: APP711
- 912 — APPLICATION NAME: WebApp01
- 913 — FRONT PAGE URL: http://www.canon.com/myportal?app=webapp01
- 914 — CONTEXT ROOT URL: http://www.canon.com/webapp01
- 915 — SSB SETTING: cookie=on, address_bar=off, cache=off, warn_not_exist_rootcert=on
- 916 — DEVICE INFORMATION LIST: user_id, device_id, device_model, encrypt_pdf, print_service_ver
- 921 — GRACE PERIOD: 4320min
- 922 — LAST UPDATE TIME: 2016/06/23 16:03:05
  ...

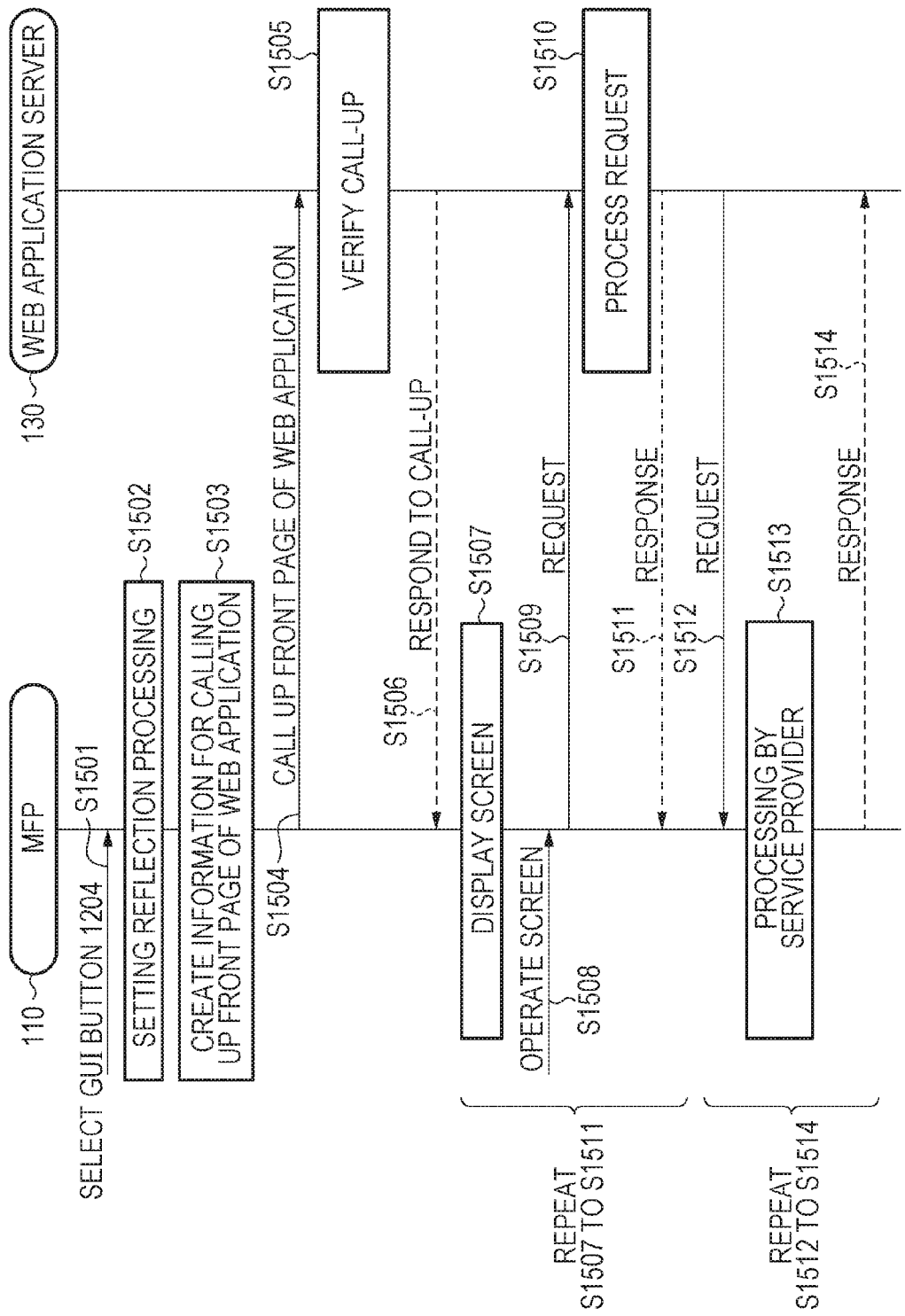

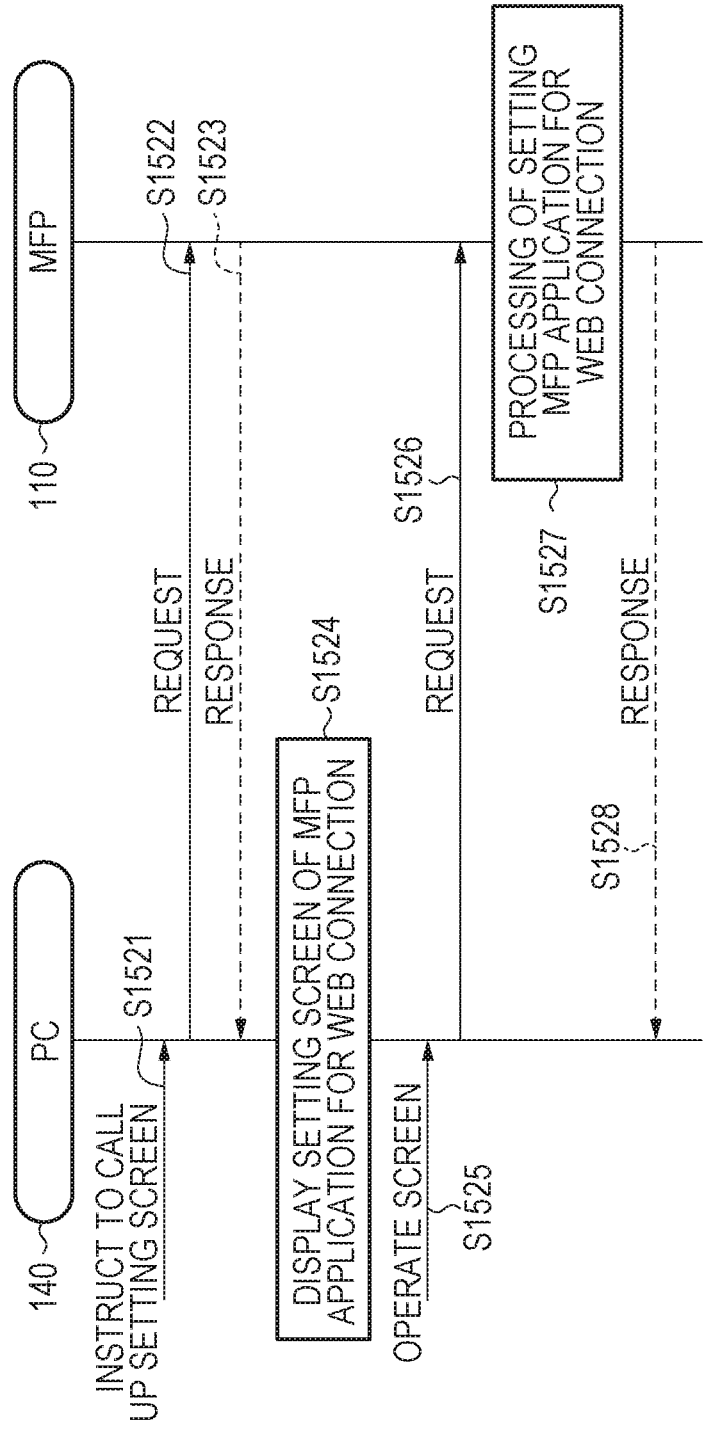

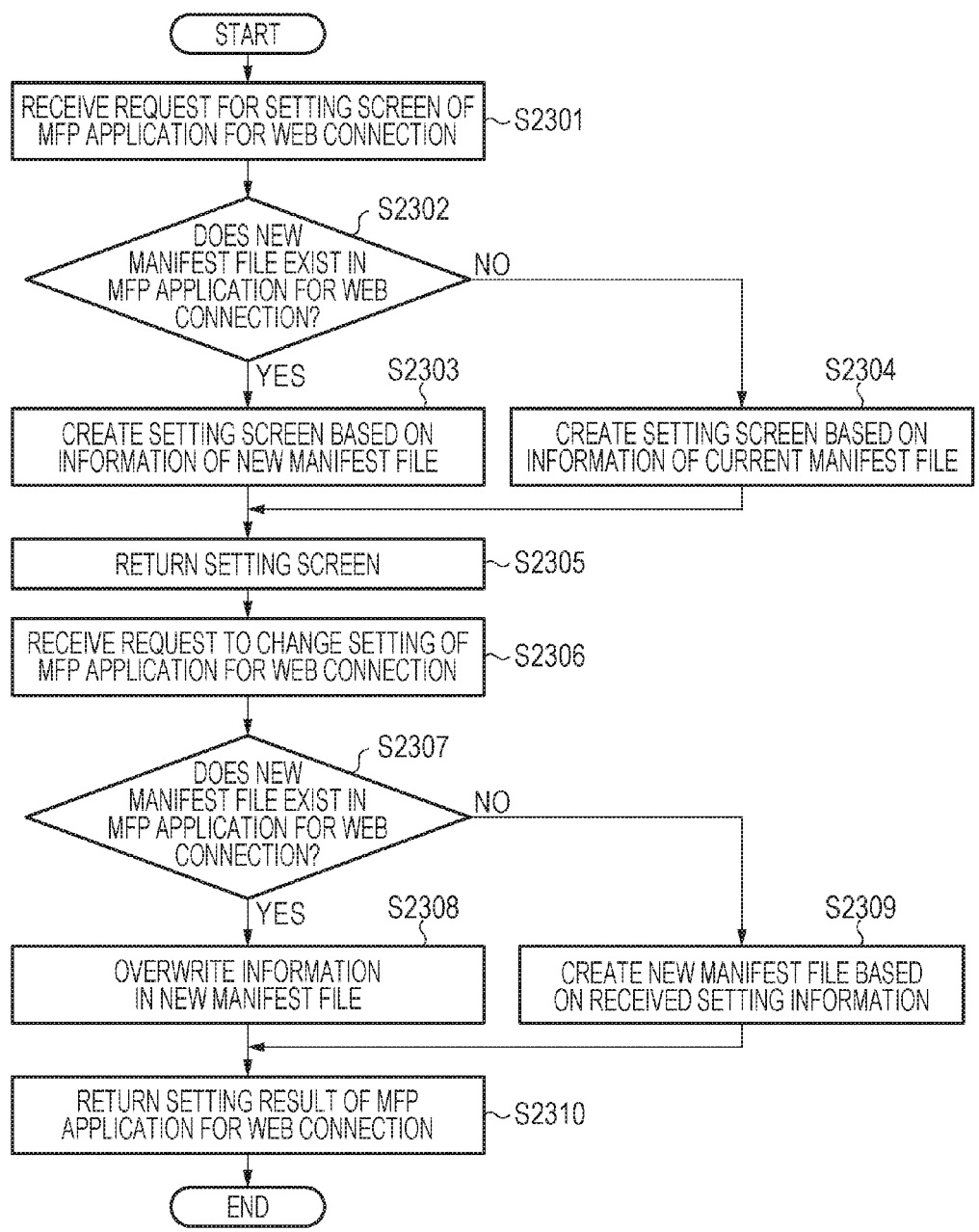

INFORMATION PROCESSING SYSTEM, INFORMATION PROCESSING APPARATUS AND CONTROL METHOD THEREFOR, AND PROGRAM FOR PREVENTING INCONSISTENCY OF A SETTING

BACKGROUND

Field of the Disclosure

The present disclosure relates to an information processing system, an information processing apparatus and a control method therefor, and a program.

Description of the Related Art

In recent years, a system capable of expanding the function of a multifunction peripheral (hereinafter referred to as MFP) by installing an application in the MFP has widely been used for an MFP having a scan function and a print function. In addition, a mechanism for managing licenses of applications for each MFP is known (for example, Japanese Patent Laid-Open No. 2006-40217).

Meanwhile, it is known that an operation screen of a web application provided from a web server connected via a network is displayed by a web browser provided in an MFP, and a user operates the operation screen. There is also known an image processing apparatus such as an MFP that executes image processing in response to a request from a web application on a web server (for example, Japanese Patent Laid-Open No. 2012-105071).

For example, in a case where a web browser and a job execution unit on the image processing apparatus and an external web server cooperate to achieve a series of processing (hereinafter referred to as life cycle) as disclosed in Japanese Patent Laid-Open No. 2012-105071, it is assumed that the setting designed for a web application on the image processing apparatus is changed. Here, if the setting is changed in the middle of the life cycle, the setting of the web browser and the job execution unit on the image processing apparatus does not match the setting of the web application on the web server, which may cause a problem with the execution of a job, for example.

SUMMARY

The present disclosure relates to preventing inconsistency of the setting in a series of processing by allowing a setting change at appropriate timing, even in a case where a web application and an image processing apparatus cooperate to achieve the series of processing.

The present invention has the following configuration. That is, an information processing apparatus having a web browser, including, an update unit configured to update a setting related to a web application with a new setting in response to an instruction to access the web application; and an access unit configured to access, in response to the instruction, an access destination included in the setting updated by the update unit using the web browser.

Further features of the present disclosure will become apparent from the following description of exemplary embodiments (with reference to the attached drawings).

BRIEF DESCRIPTION OF THE DRAWINGS

FIG. 4 is a block diagram illustrating a configuration of software modules of the license management server according to one or more aspects of the present disclosure.

FIG. 5 is a diagram illustrating an example of a license file according to one or more aspects of the present disclosure.

FIG. 6 is a block diagram illustrating a configuration of software modules of the PC according to one or more aspects of the present disclosure.

FIG. 9A is a diagram illustrating an example of a manifest file of the local MFP application according to one or more aspects of the present disclosure, and FIGS. 9B and 9C are diagrams illustrating an example of a manifest file of the MFP application for web connection according to one or more aspects of the present disclosure.

FIGS. 15A and 15B are sequence diagrams illustrating an example of processing in the information processing system according to one or more aspects of the present disclosure.

FIG. 23 is a flowchart illustrating an example of processing in the MFP according to one or more aspects of the present disclosure.

DESCRIPTION OF THE EMBODIMENTS

Hereinafter, embodiments of the present disclosure will be described in detail with reference to the accompanying drawings. Note that the following embodiments do not limit the present disclosure according to the claims, and all combinations of features described in the embodiments are not necessarily indispensable to the solution to the present disclosure.

In the embodiments, an application is defined as follows. An application provided from a web server connected via a network is referred to as a web application. An operation screen of the web application is displayed using a web browser included in an image processing apparatus or an image forming apparatus such as a multifunction peripheral (hereinafter referred to as MFP). Meanwhile, an application to be installed in the MFP is referred to as an MFP application. The installed MFP application is stored as data in the MFP.

First Embodiment

Information Processing System

Figure 1:
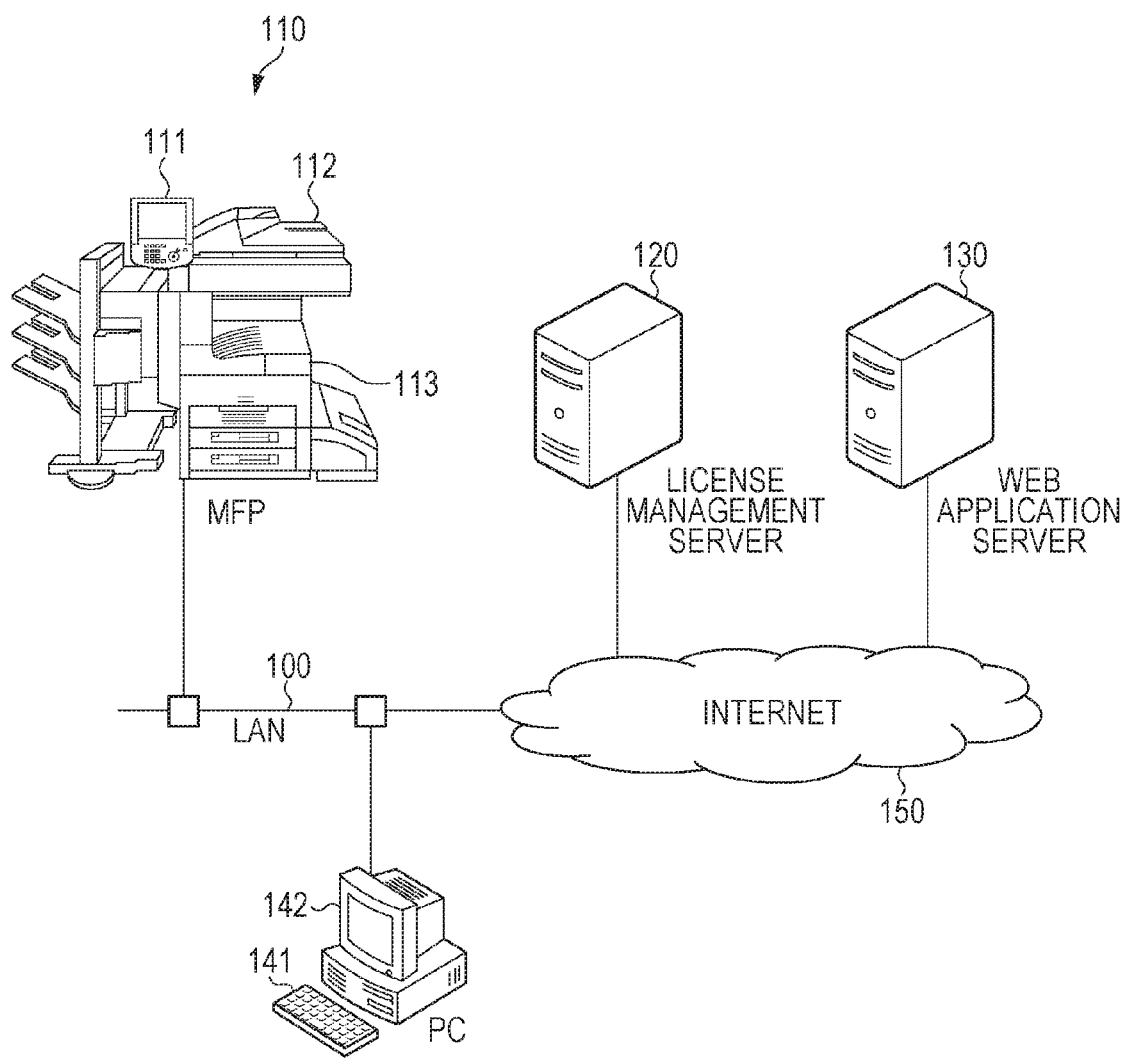
FIG. 1 is a diagram illustrating the overall configuration of an information processing system according to one or more aspects of the present disclosure.

FIG. 1 is a diagram illustrating the overall configuration of an information processing system according to an embodiment of the present disclosure. In this information processing system, an MFP 110 and a PC 140 that is an external device of the MFP 110 are connected via a LAN 100. The LAN 100 is connected to the Internet 150. Furthermore, a license management server 120 and a web application server 130 are connected to the Internet 150.

The MFP 110 is a multifunction peripheral (multifunction processing apparatus) including an operation unit 111, a scanner unit 112, and a printer unit 113. The MFP 110 according to the embodiment also functions as a client terminal that displays and operates an operation screen of a web application using a built-in web browser. The MFP 110 provides a resource or a service to the web application in response to an instruction from the web application. For example, the MFP 110 can print an image acquired from the web application using the printer unit 113 in response to an instruction from the web application, and transmit, to the web application, image data obtained by reading a document using the scanner unit 112. The MFP 110 can also display a web page on the setting screen, and change the setting of the MFP 110 in response to a request from the PC 140. Note that an identifier called a device ID is assigned to the MFP 110 according to this embodiment, and each MFP can be identified and recognized uniquely by this identifier. Although the MFP 110 has a printer function and a scanner function, the MFP 110 can also be called an information processing apparatus from the viewpoint of processing images and other information.

The license management server 120 manages licenses of MFP applications. The web application server (hereinafter referred to as a web server) 130 executes a web application.

The PC 140 includes an operation unit 141 and a display unit 142, and functions as a terminal device for performing various settings on the MFP 110. The PC 140 can display, on the display unit 142, a web page of the setting screen provided by the MFP 110, and transmit, to the MFP 110, the setting contents input by the user to the operation unit 141 to thereby set the MFP 110. However, the entire system and the system configuration of each of the MFP 110, the license management server 120, and the PC 140 described above are merely examples, and the number of these devices and the like are not limited to those in this embodiment.

Figure 2:
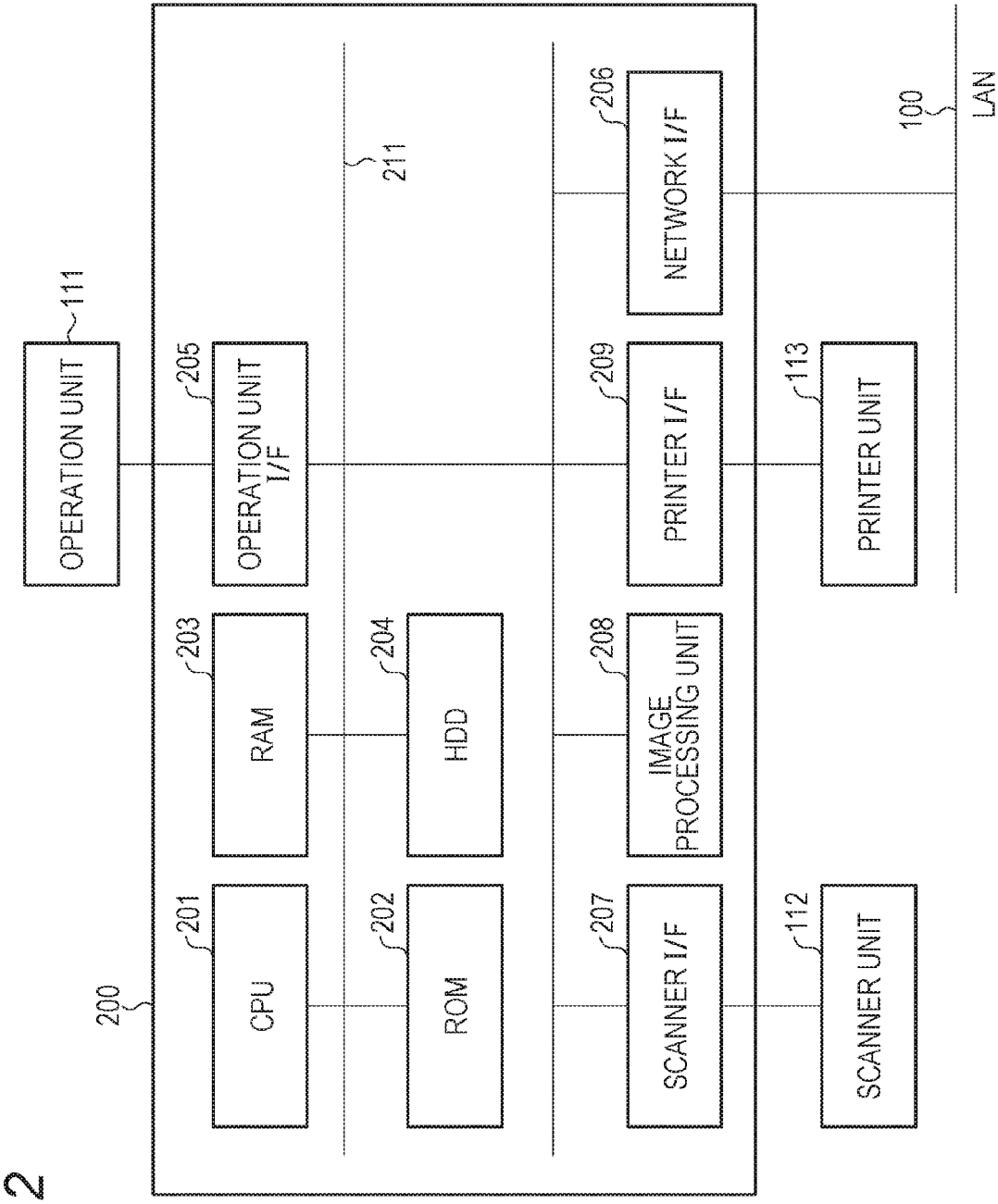
FIG. 2 is a block diagram illustrating a hardware configuration of an MFP according to one or more aspects of the present disclosure.

FIG. 2 is a block diagram illustrating a hardware configuration of the MFP 110 according to the embodiment. The operation unit 111 includes a display unit having a touch panel function, various hard keys and the like, displays information to the user according to data from a control unit 200, and inputs information according to the user's operation to the control unit 200. The scanner unit 112 reads an image on a document, creates image data of the image, and supplies the image data to the control unit 200. The printer unit 113 prints the image on a sheet based on the image data received from the control unit 200.

The control unit 200 is electrically connected to the operation unit 111, the scanner unit 112, and the printer unit 113, and is also connected to the LAN 100 via a network interface (I/F) 206. As a result, communication using a communication protocol such as TCP/IP via the LAN 100 is enabled. In the control unit 200, a CPU 201, a ROM 202, a RAM 203, an HDD 204, an operation unit I/F 205, the network I/F 206, a scanner I/F 207, an image processing unit 208, and a printer I/F 209 are connected via a system bus 211. The CPU 201 executes a boot program of the ROM 202, develops an OS and a control program stored in the HDD 204 into the RAM 203, executes the control program, and controls the MFP 110 as a whole. This control also includes execution of a program for realizing a flowchart to be described below. The boot program and various data of the MFP 110 are stored in the ROM 202. The RAM 203 provides a work memory for the CPU 201 to operate, and also provides an image memory for temporarily storing image data. The HDD 204 is a hard disk drive, and stores an OS, various programs, and image data. The operation unit I/F 205 is an interface unit for connecting the system bus 211 and the operation unit 111. The network I/F 206 is connected to the LAN 100 and the system bus 211, and inputs and outputs information via the network. The scanner I/F 207 controls the interface between the scanner unit 112 and the control unit 200. The image processing unit 208 performs image processing such as rotation, color conversion, and image compression/decompression processing on the image data input from the scanner unit 112 and the image data to be output to the printer unit 113. The printer I/F 209 receives the image data processed by the image processing unit 208, and controls printing by the printer unit 113 according to attribute data attached to the image data. Note that in the embodiment, an example of an MFP capable of displaying a UI using the operation unit 111 will be described. However, an information processing apparatus such as a general-purpose computer may be adopted in place of the MFP 110.

Figure 3:
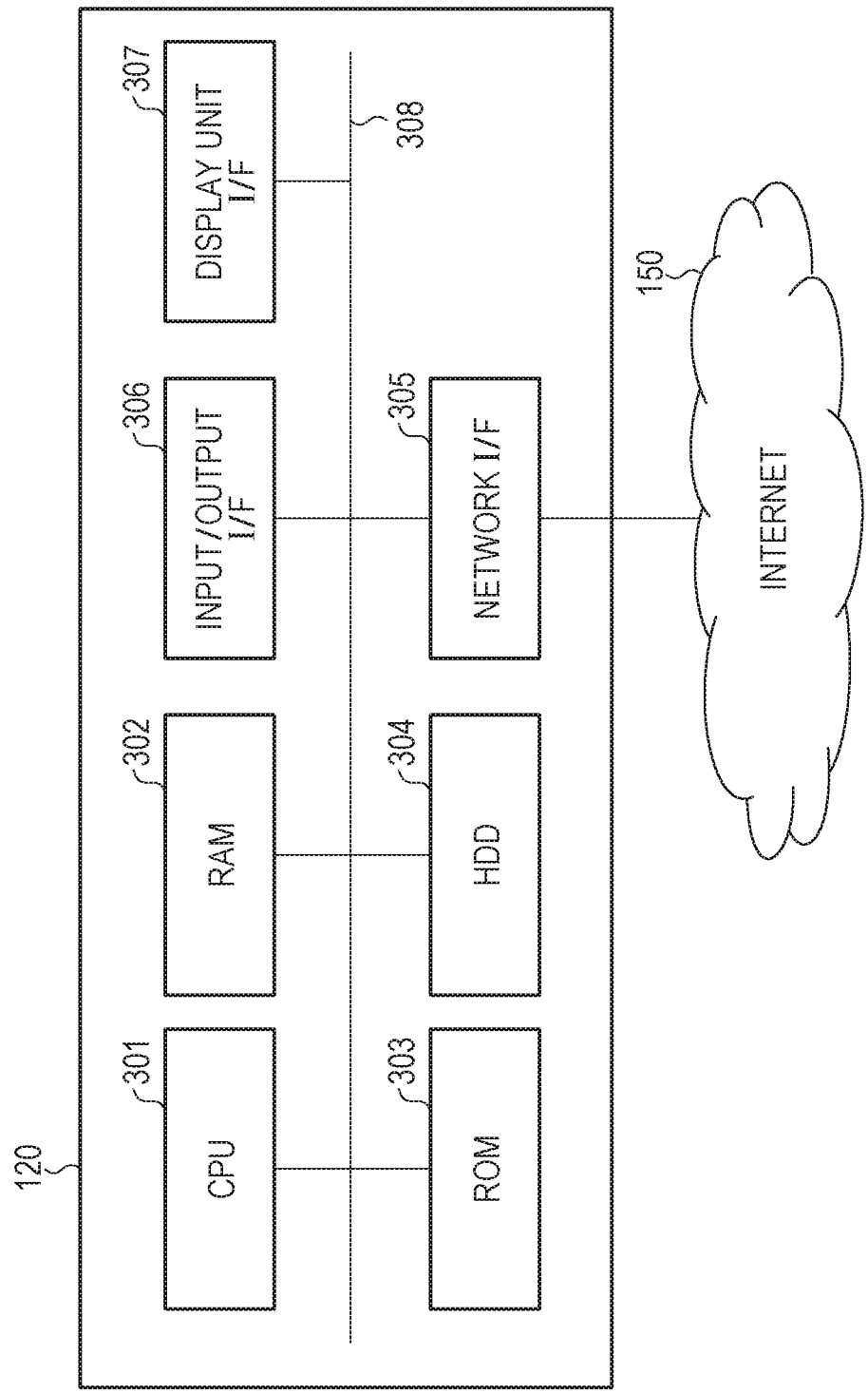
FIG. 3 is a block diagram illustrating a hardware configuration of a license management server and a PC according to one or more aspects of the present disclosure.

FIG. 3 is a block diagram illustrating a hardware configuration of the license management server 120 according to the embodiment. The license management server 120 includes a CPU 301, a RAM 302, a ROM 303, an HDD 304, a network I/F 305, an input/output I/F 306, and a display unit I/F 307, which are communicably connected to one another via a system bus 308. The ROM 303 stores a boot program. When the power is turned on, the CPU 301 reads the boot program and develops an OS, a control program and the like installed in the HDD 304 into the RAM 302. Then, by the CPU 301 executing the program developed in the RAM 302, the function of the license management server 120 is realized. This control also includes execution of a program for realizing a flowchart to be described below. The CPU 301 also communicates with other devices on the network connected via the network I/F 305. The hardware configurations of the web application server 130 and the PC 140 are also similar to the hardware configuration of the license management server 120 illustrated in FIG. 3; therefore, description thereof will be omitted.

Software of License Management Server

FIG. 4 is a block diagram illustrating a configuration of software modules of the license management server 120 according to the embodiment. Programs for realizing these modules are stored in the HDD 304 of the license management server 120, and the functions of these modules are achieved by developing the programs into the RAM 302 and executing the programs by the CPU 301. The license management server 120 according to the present embodiment performs three kinds of processing, i.e., encrypting the MFP application, issuing a license for installing an MFP application in each MFP, and issuing a license access number for managing the individual licenses.

A communication unit 401 communicates with an external device via a network to accept a processing request, and distributes the request to an MFP application management unit 402 and a license management unit 404 according to the processing request. The MFP application management unit 402 receives the unencrypted MFP application and encrypts the MFP application. The MFP application management unit 402 receives an MFP application from an application development vendor through a terminal (not illustrated) connected to the Internet 150. Then, an ID (hereinafter referred to as MFP application ID) for uniquely identifying the MFP application and an encryption common key of the MFP application are generated and registered in an MFP application management table 403. The MFP application ID is identification information for identifying each MFP application. The encryption common key of the MFP application is a cryptographic key for encrypting the MFP application. Then, the MFP application is encrypted using the encryption common key, and the encrypted MFP application and the MFP application ID are transmitted to a request source. The MFP application management table 403 is a database that stores the MFP application ID generated by the MFP application management unit 402 and the encryption common key of the MFP application in association with each other.

The license management unit 404 issues a license for installing an MFP application to each MFP and manages a license access number for issuing the license. Upon receiving, from a vendor selling applications, a request to issue a license access number corresponding to the MFP application to be sold, the license management unit 404 issues the license access number corresponding to that MFP application. Then, the license access number is registered in a license management table 406. Here, the license access number is a number for uniquely managing one license of the MFP application, and the application vendor sells the above-described encrypted MFP application together with the license access number therefor. Upon receiving the license access number and the device ID from a purchaser of the MFP application, the license management unit 404 issues a license to the purchaser (user). The issuance of this license is processing of referring to the MFP application management table 403 and the license management table 406 to create a license file corresponding to the license access number.

Here, first, the MFP application ID is acquired from the license access number, and the encryption common key of the MFP application associated with the MFP application ID is acquired. Then, a license ID is issued, the device ID and the license ID are recorded in the license management table 406, and a license file is created using these pieces of information as one file. The license file created in this manner is encrypted with an encryption key 405 of the license file held inside the license management unit 404 and transmitted to the request source. The encryption key 405 of the license file is a public key in the public key cryptosystem. Note that a private key corresponding to the encryption key 405 is included in software of the MFP 110 described below. The license management table 406 is a database that stores information related to licenses.

In the license management table 406, the MFP application ID and the device ID of the MFP 110 are registered in association with each other. By referring to the license management table 406, therefore, it is possible to understand the license of which MFP application has been issued to which MFP.

FIG. 5 is a diagram illustrating an example of a license file issued by the license management server 120 according to the embodiment. Here, an example of a license file corresponding to the license management table 406 in the license management server 120 is illustrated. A license sense ID (LIC002), an MFP application ID (APP712), a device ID (DEV002), and a period of validity (60 days) are obtained from the license management table 406. An encryption common key (WasiIDcQR6dYj . . . ) of the application (APP712) is obtained from the MFP application management table 403 in the license management server 120. In this manner, the license file is created based on the information the license management unit 404 has acquired from the MFP application management table 403 and the license management table 406.

In this manner, the purchaser of the MFP application can acquire the encrypted license file based on the license access number of the purchased MFP application.

PC Software

FIG. 6 is a diagram illustrating a configuration of software modules of the PC 140 according to the embodiment. Programs for realizing these modules are stored in the HDD 304 of the PC 140, and the functions of these modules are achieved by developing the programs in the RAM 302 and executing the programs by the CPU 301.

The PC 140 according to the present embodiment performs processing of causing the display unit to display the setting screen (including the installation screen) of the MFP and the screen of the license management server 120, and transmitting, to the MFP, the setting contents input by the user to the operation unit as a setting request.

A web browser 601 requests the setting screen of the MFP 110 via a communication unit 602, acquires the setting screen, displays the setting screen on the display unit 142 through a screen processing unit 603, and accepts the MFP setting from the user on the setting screen. In addition, the web browser 601 transmits, through the communication unit 602, a setting request to the MFP 110 together with the MFP setting contents input to the operation unit 141. The web browser 601 then receives the result of the setting request, and displays the setting result on the display unit 142 through the screen processing unit 603. Furthermore, the PC 140 requests the setting screen of the license management server 120 to display the setting screen on the display unit 142, and transmits, to the license management server 120, the setting contents input by the user to the operation unit 141. The communication unit 602 communicates with an external device via a network, transmits a processing request to the external device, and distributes a response to the request to the web browser 601 according to the response. The screen processing unit 603 displays the setting screen and the setting result screen of the MFP 110 in response to a request from the web browser 601.

MFP Software

Figure 7:
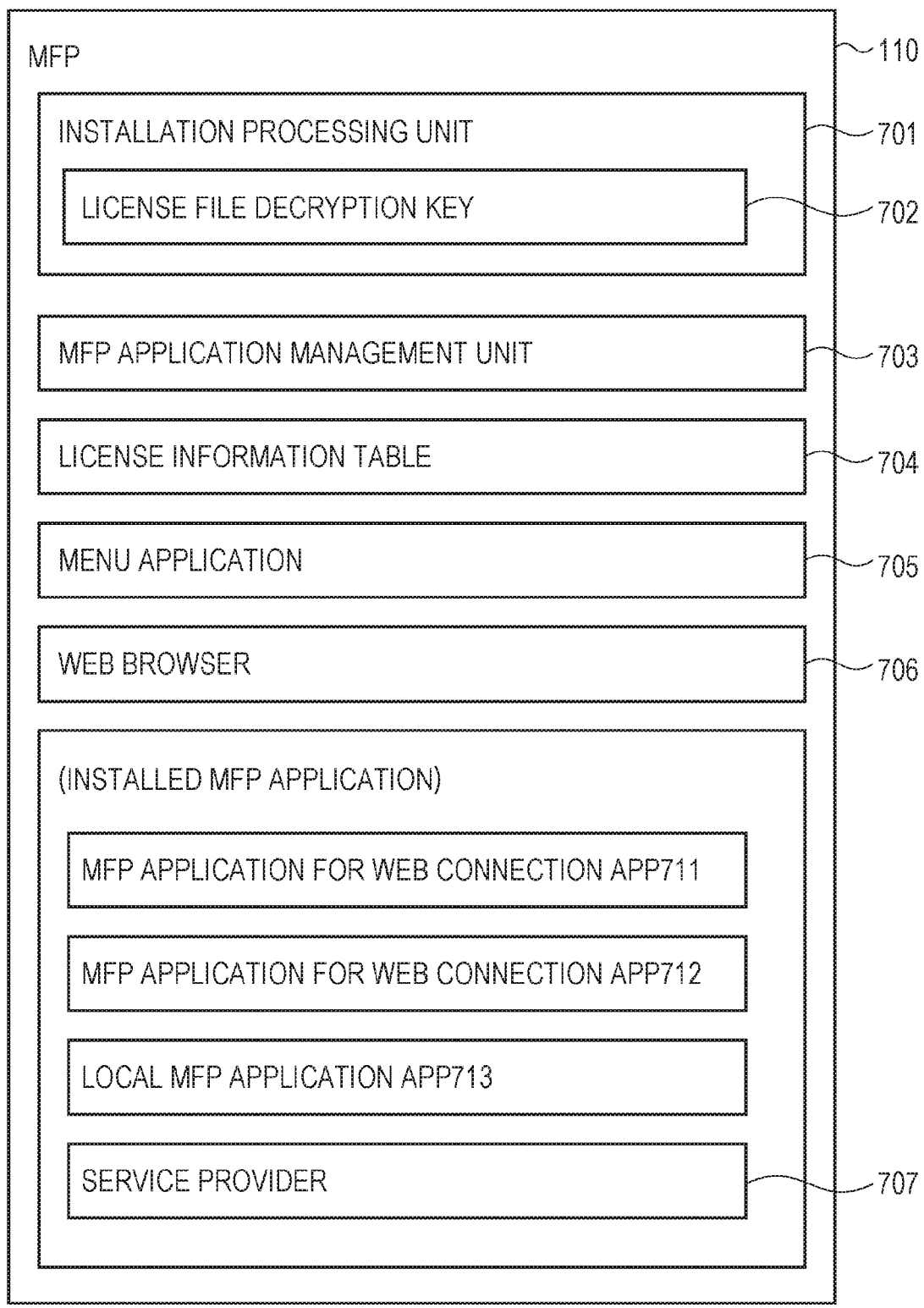
FIG. 7 is a diagram illustrating a configuration of applications and software modules of the MFP according to one or more aspects of the present disclosure.

FIG. 7 is a diagram illustrating a configuration of software modules of the MFP 110 according to the embodiment. These software modules are stored in the HDD 204 of the MFP 110, and developed in the RAM 203 and executed by the CPU 201 at the time of execution.

An installation processing unit 701 controls the installation of an MFP application. The installation processing unit 701 is connected to the PC 140 via the network I/F 206, and installs an MFP application according to an instruction from the PC 140. In addition, the installation processing unit 701 includes a license file decryption key 702 for decrypting the encrypted license file. The license file decryption key 702 corresponds to the encryption common key of the MFP application in FIG. 5 described above. An MFP application management unit 703 manages the MFP application installed in the MFP 110. A license information table 704 is a database that stores information related to the installed MFP applications and license files. The license information table 704 holds an MFP application ID, a period of validity of the license, a license ID, and a license ID history. The license ID history is a history of the license IDs installed in the past, and is retained for preventing reuse of the license.

A menu application 705 displays a GUI for selecting and executing the MFP application installed in the MFP 110. A web browser 706 communicates with the web application server 130. The web browser 706 transmits a request to the web application server 130 using an HTTP protocol, and renders the HTML data returned in response to the request and displays the rendered HTML data on the operation unit 111, or interprets and executes the returned JavaScript (registered trademark).

Although not illustrated in FIG. 7, the MFP 110 may include a web server serving in response to a request from the web browser 601. The MFP application can be described using, for example, Java (registered trademark), in which case an execution environment for executing the MFP application described in Java (registered trademark) is also provided in the MFP 110.

Installation Processing of MFP Application

Next, installation of an MFP application by the purchaser of the MFP application will be described. The user transmits an encrypted application and an encrypted license file to the installation processing unit 701 using the PC 140, whereby the installation processing unit 701 installs the MFP application. At this time, first, the license file is decrypted using the license file decryption key 702. Then, the encrypted MFP application is decrypted using the encryption common key of the MFP application included in the decrypted license file. The MFP application thus decrypted is transferred to the MFP application management unit 703 and stored in the HDD 204. At this time, the device ID described in the decrypted license file is compared with the device ID preset in the MFP 110 to determine whether the license file is a correct one. In addition, based on the period of validity described in the license file and the current date and time, the date and time at which the MFP application becomes invalid is calculated, and managed by the MFP application management unit 703 as the expiration date.

In FIG. 7, it is assumed that three MFP applications of APP711, APP712, and APP713 are installed as an example of the embodiment. It is further assumed in FIG. 7 that a service provider 707 is also installed as an MFP application. Note that in the present embodiment, two types of MFP applications are defined as an MFP application: a MFP application for web connection (also referred to as an application for web connection) and a local MFP application. In addition, when simply described as an MFP application, it is a generic term for the MFP application for web connection and the local MFP application. APP711 and APP712 are MFP applications for web connection and APP713 is a local MFP application. The service provider 707 is a local MFP application.

The local MFP application is an application that provides the MFP 110 with functions using the scanner unit 112, the printer unit 113, the image processing unit 208 and the like of the MFP 110 as software modules. The local MFP application executes the function provided thereby in the MFP 110 by invoking its own software module. Details of the local MFP application will be described below with reference to FIG. 8A.

Meanwhile, the MFP application for web connection is an application for the MFP 110 to execute the function provided by the web application arranged in the web server. The MFP application for web connection connects to the web application using the web browser 706 and causes the MFP 110 to execute the function provided by the web application. Details of the MFP application for web connection will be described below with reference to FIG. 8B.

Meanwhile, the service provider 707 provides resources and services of the MFP 110 according to an instruction from the web application. As a result, the service provider 707 can print an image acquired from the web application using the printer unit 113, and transmit, to the web application, image data obtained by reading a document using the scanner unit 112. Note that in the present embodiment, the service provider 707 is configured as a local MFP application, but may be configured as an application arranged in advance in the MFP 110, such as the menu application 705 and the web browser 706. The type and number of MFP applications installed in the MFP are different for each MFP.

Software Module of Local MFP Application

Figure 8A:
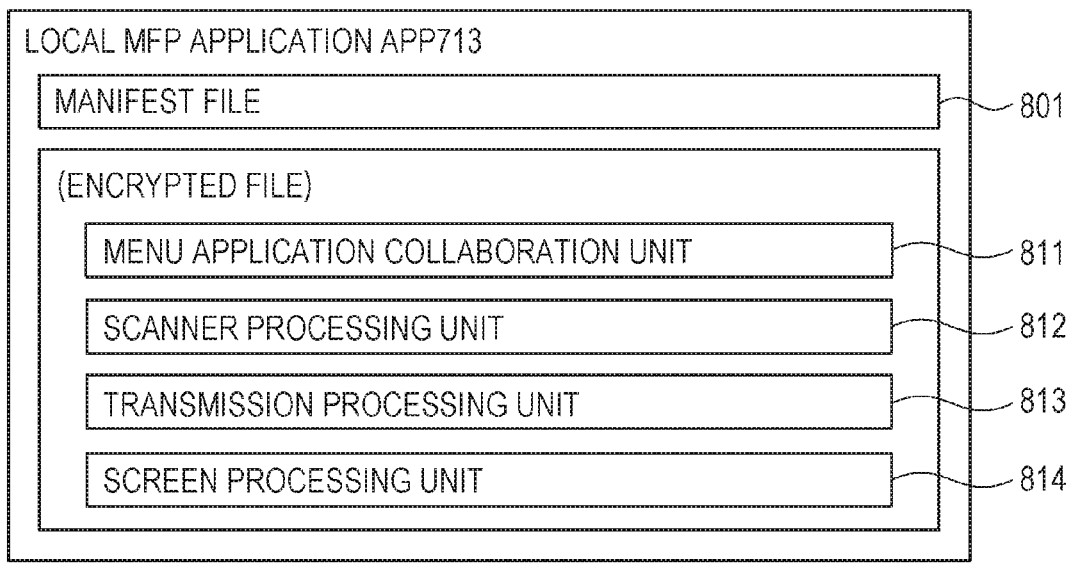
FIG. 8A is a diagram illustrating a configuration of software modules of a local MFP application according to one or more aspects of the present disclosure.

FIG. 8A is a diagram illustrating a configuration of software modules of the local MFP application 713 according to the embodiment. The local MFP application 713 has a different software module configuration depending on the functions to be provided. FIG. 8A illustrates, as an example, a software module configuration of a local MFP application that provides a function of transmitting a document read by the scanner unit 112 to the outside through the network I/F 206. These software modules illustrated in FIG. 8A are stored in the HDD 204 of the MFP 110, and developed in the RAM 203 and executed by the CPU 201 at the time of execution.

A manifest file 801 is a file describing the basic information of the MFP application. FIG. 9A illustrates an example of a manifest file of the local MFP application 713 according to the embodiment. An MFP application ID 911 and an application name 912 are defined in the manifest file. The MFP application ID 901 is the same ID as that managed by the MFP application management table 403. The application name 902 represents the name of the MFP application.

A menu application collaboration unit 811 is a module that collaborates with the menu application 705, and registers a GUI button for invoking the local MFP application in the menu application 705. A scanner processing unit 812 is a module for reading a document using the scanner unit 112. A transmission processing unit 813 is a module for transmitting the document read by the scanner processing unit 812 to the outside through the network I/F 206. A screen processing unit 814 is a module for displaying an operation screen of the local MFP application APP713 on the operation unit 111.

Since local MFP applications each have different functions to be realized, it is necessary for an application development vendor to program a software module for realizing the function for each application.

By sending the created local MFP application to the license management server 120, software modules other than the manifest file 801 are encrypted and collected as one file. The application development vendor can prevent a third party from analyzing the contents of this application, using the encryption function of this application.

Software Module of MFP Application for Web Connection

Figure 8B:
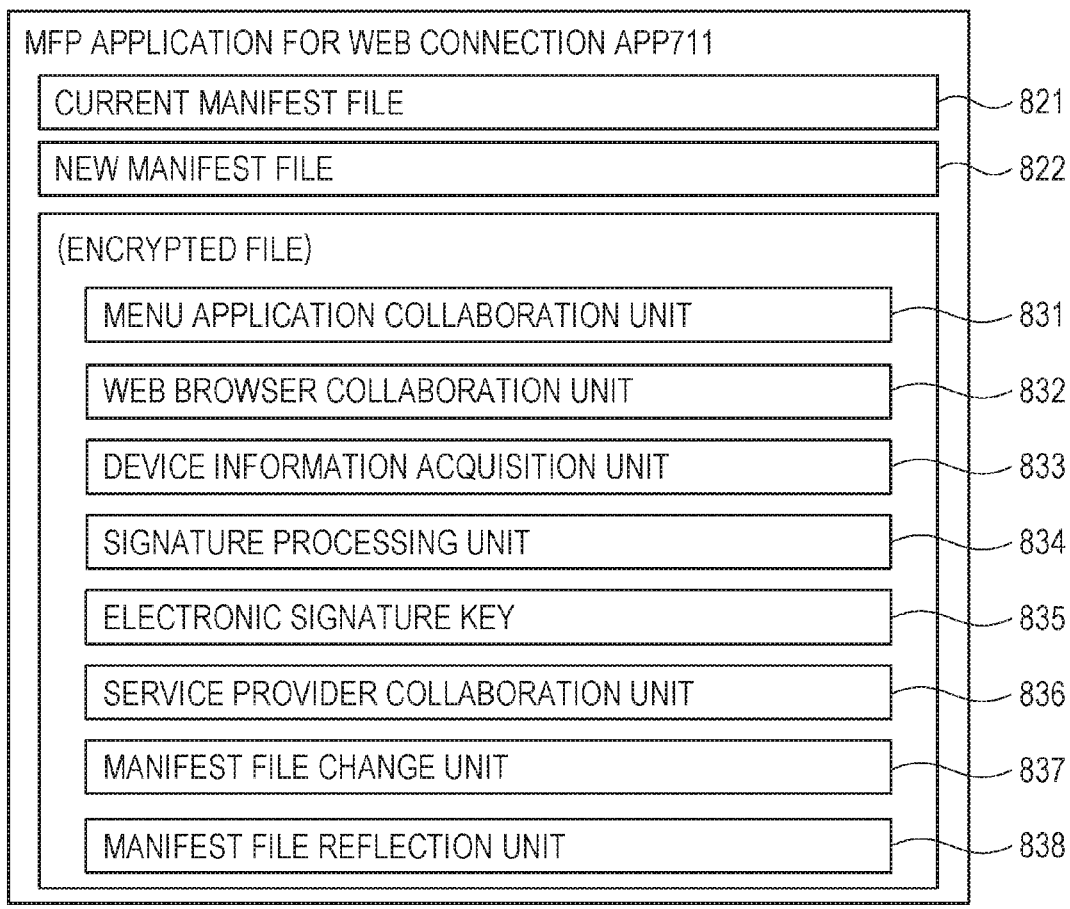
FIGS. 8B and 8C are diagrams illustrating a configuration of software modules of an MFP application for web connection according to one or more aspects of the present disclosure.

FIG. 8B is a diagram illustrating a configuration of software modules of the MFP application for web connection according to the embodiment. The MFP application for web connection holds, for each web application, the necessary setting information in a current manifest file 821, a new manifest file 822, and an electronic signature key 835. That is, one MFP application for web connection is required for one web application. The MFP application for web connection corresponding to a web application to be used is installed in the MFP 110. In a case of using multiple web applications, multiple MFP applications for web connection are installed in the MFP 110. In that case, the multiple MFP applications for web connection share one web browser 706.

The software modules of the MFP application for web connection illustrated in FIG. 8B are stored in the HDD 204 of the MFP 110, and developed in the RAM 203 and executed by the CPU 201 at the time of execution.

The current manifest file 821 is a file in which basic information of the MFP application and information for connecting to the web application are described. The new manifest file 822 is a manifest file for storing a new setting when changing the information of the current manifest file 821. The new manifest file 822 is created when the setting of the current manifest file 821 is changed by a manifest file change unit 837. At the time of application development, the application development vendor creates only the current manifest file 821 and arranges it in the MFP application for web connection. Therefore, the new manifest file 822 is not included in the MFP application for web connection before installation of the MFP application for web connection and immediately after the installation. In the present embodiment, the new manifest file 822 is arranged in the MFP application for web connection, but may be arranged in the RAM 203, the ROM 202, the HDD 204 or the like on the MFP 110 in association with the MFP application for web connection. In that case, the MFP application for web connection in FIG. 8B does not include the new manifest file 822 but only includes the current manifest file.

FIG. 9B illustrates an example of a manifest file according to the embodiment. In the manifest file, an MFP application ID 911, an application name 912, a front page URL 913, a context root URL 914, an SSB setting 915, and a device information list 916 are defined.

The MFP application ID 911 and the application name 912 have definitions similar to those of the MFP application ID 901 and the application name 902 in the manifest file of the local MFP application illustrated in FIG. 9A. The front page URL 913, the context root URL 914, the SSB setting 915, and the device information list 916 are information unique to the MFP application for web connection.

The front page URL 913 represents the URL of the front page of the web application. The context root URL 914 represents the highest path of the web application. The front page URL is used as the URL for calling up the web browser from the MFP application for web connection. Furthermore, the front page URL and the context root URL are used to check the web application server when making a request for inputting a job from the web application server to the service provider of the MFP 110. The site specific browser (SSB) setting 915 represents setting values to be set in the web browser when this MFP application connects to the web application. The SSB setting includes setting related to the UI of the web browser and setting related to communication. Examples of the setting related to the UI of the web browser include hiding a tool bar, restricting the URL input, and restricting the addition of favorites. Examples of the setting related to communication include a cookie processing method, display restriction of an HTTPS/HTTP mixed page, and cache availability. By setting the SSB for each MFP application connected to the web application, it is possible to set a dedicated web browser for each web application. In a case where the SSB setting is not used, it is also possible not to define the SSB setting 915 in the manifest file. The device information list 916 represents a list of device information to be notified when calling up the front page of the web application. The device information refers to information about the MFP 110, and examples thereof include information for specifying an individual device and a model of the MFP 110, an option function effective in the MFP 110, a name of a user who has logged in, and a version of the software. In a case where it is not necessary to acquire device information, it is also possible not to define the device information list 916 in the manifest file.

A menu application collaboration unit 831 is a module that collaborates with the menu application 705, and registers a GUI button for invoking the MFP application for web connection in the menu application 705. A web browser collaboration unit 832 is a module for operating the web browser 706, passes the URL of the web application to the web browser 706, and displays the web browser 706 on the front face of the operation unit 111. A device information acquisition unit 833 acquires the device information specified in the device information list 916. A signature processing unit 834 generates an electronic signature to be added at the time of connection to the web application. The electronic signature is generated using the electronic signature key 835. The electronic signature is used by the web application to check whether the call is coming from the MFP application for web connection. The web application is allowed to omit this check, in which case the electronic signature is unnecessary, and therefore the MFP application for web connection does not include the electronic signature key 835.

A service provider collaboration unit 836 is a module for transmitting the current manifest file 821 in response to a request from the service provider 707.

The manifest file change unit 837 has a function as a web application, and is a module for providing a setting screen for accepting a change to the current manifest file 821. The manifest file change unit 837 transmits a screen for changing the current manifest file 821 in response to a request from the web browser 601 of the PC 140, or accepts a request for changing the current manifest file 821. In response to the request for changing the current manifest file 821, the manifest file change unit 837 creates the new manifest file 822. Note that in the present embodiment, the manifest file change unit 837 provides a manifest file setting screen as a web application, but a manifest file changing screen may be displayed on the operation unit 111 of the MFP 110. The manifest file change unit 837 can be realized by, for example, a Java (registered trademark) Servlet. A manifest file reflection unit 838 reflects the contents of the new manifest file 822 in the current manifest file 821 when the user starts the MFP application for web connection. Details of the processing will be described with reference to FIG. 17A.

The differences among the individual MFP applications for web connection are the description of the current manifest file 821 and the new manifest file 822 and the electronic signature key 835, and the other software modules are the same for all the MFP applications for web connection. That is, by diverting the software modules, it is possible to create an MFP application for web connection simply by defining information about a web application. For example, it is possible to easily create an MFP application for web connection by preparing a tool that outputs the MFP application for web connection upon input of information about the web application.

The created MFP application for web connection is transmitted to the license management server 120, whereby the software modules and files other than the current manifest file 821 are encrypted and collected as one file. The application development vendor can prevent a third party from analyzing the contents of this application, using the encryption function of this application. It is also possible to prevent the electronic signature key 835 included in the application from being taken out.

Software Module of Web Application Server

Figure 10:
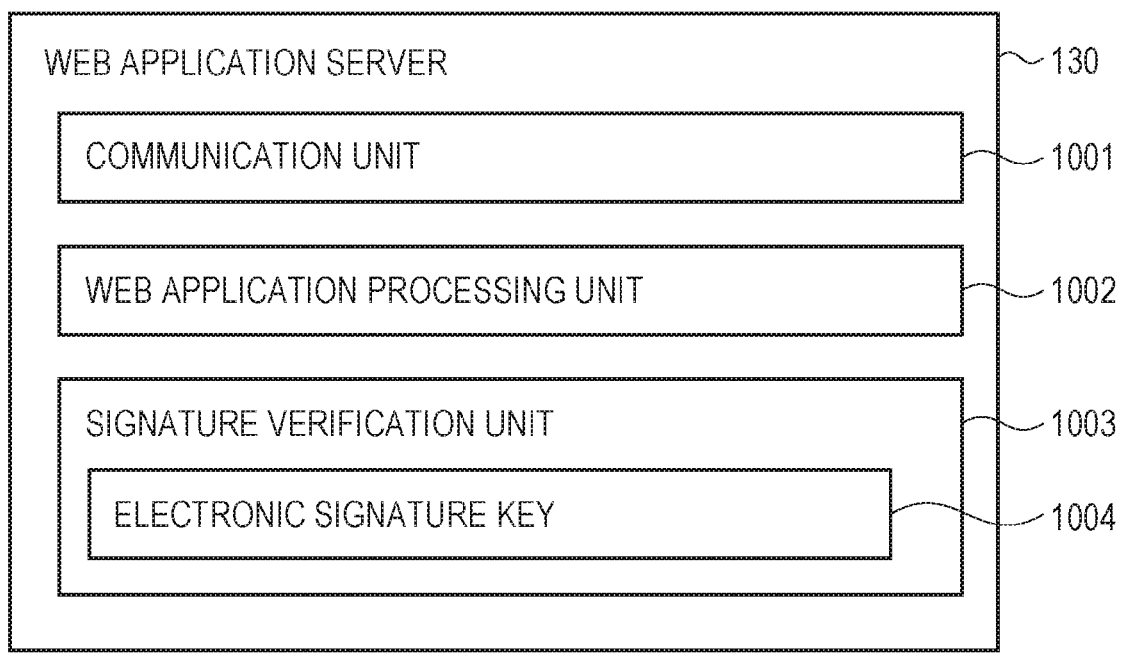
FIG. 10 is a diagram illustrating a configuration of software modules of a web application server according to one or more aspects of the present disclosure.

FIG. 10 is a diagram illustrating a configuration of software modules of the web application server 130 according to the present embodiment. These software modules are stored in the HDD 304 of the web application server 130, and developed in the RAM 302 and executed by the CPU 301 at the time of execution, whereby the functions of these software modules are achieved.

A communication unit 1001 communicates with an external device via a network to accept requests and respond. In response to a request from the MFP 110 by the HTTP protocol, a web application processing unit 1002 generates HTML content to be displayed by the web browser 706 of the MFP 110, and generates content for operating the MFP 110. In addition, the web application processing unit 1002 inputs a scan processing job or a print processing job to the service provider 707 of the MFP 110 as web application processing. A signature verification unit 1003 includes an electronic signature key 1004 corresponding to the electronic signature key 835 included in the MFP application for web connection illustrated in FIG. 8B, and verifies signature information electronically signed with this electronic signature key 1004. By verifying the electronic signature, it can be determined whether the request is coming from the MFP 110 in which the MFP application for web connection is installed. In the present embodiment, a hash-based message authentication code (HMAC) is used as the electronic signature technology as an example. That is, the electronic signature key 835 and the electronic signature key 1004 are the same private key (common key). Note that other technology may be used for the electronic signature. For example, in a case where a digital signature is used as the electronic signature technology, since the digital signature is based on a public key cryptosystem, the electronic signature key 835 of the MFP application for web connection is a private key, while the electronic signature key 1004 of the web application server 130 is a public key corresponding to the private key.

Installation Processing of MFP Application

Figure 11:
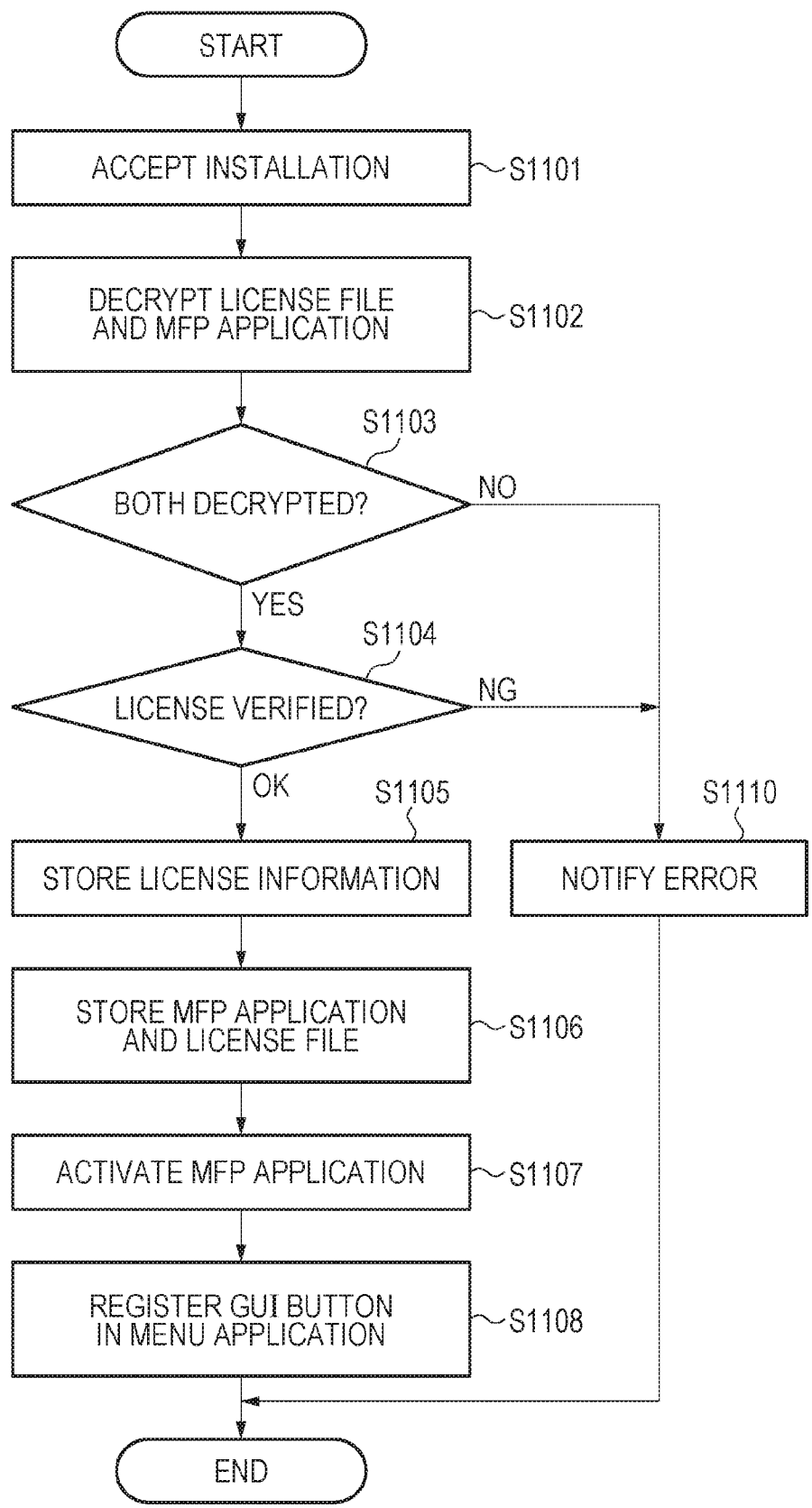
FIG. 11 is a flowchart illustrating an example of processing in the MFP according to one or more aspects of the present disclosure.

FIG. 11 is a flowchart for describing the installation processing of an MFP application performed by the MFP 110. The CPU 201 reads the program stored in the HDD 204 of the MFP 110 into the RAM 203, analyzes and executes the program, whereby the respective steps of the flowchart in FIG. 11 are executed.

As preprocessing, as described above, it is assumed that the purchaser of an MFP application has received the encrypted MFP application and license access number from the MFP application vendor and has received the license file from the license management server 120.

First, the installation processing unit 701 receives the encrypted MFP application and the encrypted license file as an installation instruction from the PC 140 operated by the MFP application purchaser (step S1101). The installation processing unit 701 decrypts the received license file using the license file decryption key 702. The installation processing unit 701 then decrypts the encrypted MFP application using the encryption common key of the MFP application included in the decrypted license file (step S1102). Here, in a case where the MFP application is a local MFP application, the modules of the menu application collaboration unit 811, the scanner processing unit 812, and the transmission processing unit 813 are decrypted. In a case where the MFP application is an MFP application for web connection, on the other hand, the modules of the menu application collaboration unit 831, the web browser collaboration unit 832, the device information acquisition unit 833, and the signature processing unit 834 are decrypted. Furthermore, the modules of the service provider collaboration unit 836, the manifest file change unit 837, and the manifest file reflection unit 838, and the file of the electronic signature key 835 are decrypted.

The installation processing unit 701 checks whether both the license file and the MFP application have been decrypted (step S1103). In a case where both of them have been decrypted, the installation processing unit 701 advances the processing to step S1104. In a case where decryption of either one of them is unsuccessful or neither of them has been decrypted, the installation processing unit 701 notifies an error (step S1110) and ends the processing.

In step S1104, the installation processing unit 701 compares the device ID described in the decrypted license file with the device ID preset in the MFP 110, and determines whether the license file is a correct one conforming to the MFP 110. If the compared two IDs match, the installation processing unit 701 determines that the license file is correct and advances the processing to step S1105. If the installation processing unit 701 determines that the license file is not correct, the installation processing unit 701 notifies the error (step S1110) and ends the processing.

In step S1105, the installation processing unit 701 stores the license information in the license information table 720. The license information includes the MFP application ID, the license ID, and the period of validity of the license. Here, the installation processing unit 701 calculates the date and time at which the MFP application becomes invalid based on the period of validity recorded in the license file and the current date and time, and registers the calculated date and time as an expiration date of the license. If the period of validity recorded in the license file is indefinite, the expiration date is also registered as indefinite.

Next, the installation processing unit 701 stores the decrypted MFP application and license file in the HDD 204.

Subsequently, the installation processing unit 701 reads the MFP application stored in the HDD 204 to the RAM 203 and activates the MFP application (step S1107). The activated MFP application registers a GUI button for invoking the MFP application in the menu application (step S1108). At this time, in a case where the activated MFP application is an MFP application for web connection, the menu application collaboration unit 831 performs the processing of step S1107. In a case where the activated MFP application is a local MFP application, on the other hand, the menu application collaboration unit 811 performs the processing of step S1107. In the case of a local MFP application that does not have a screen to be displayed on the operation unit 111 and does not need to register GUI buttons in the menu application, the processing of step S1108 is skipped.

Figure 12:
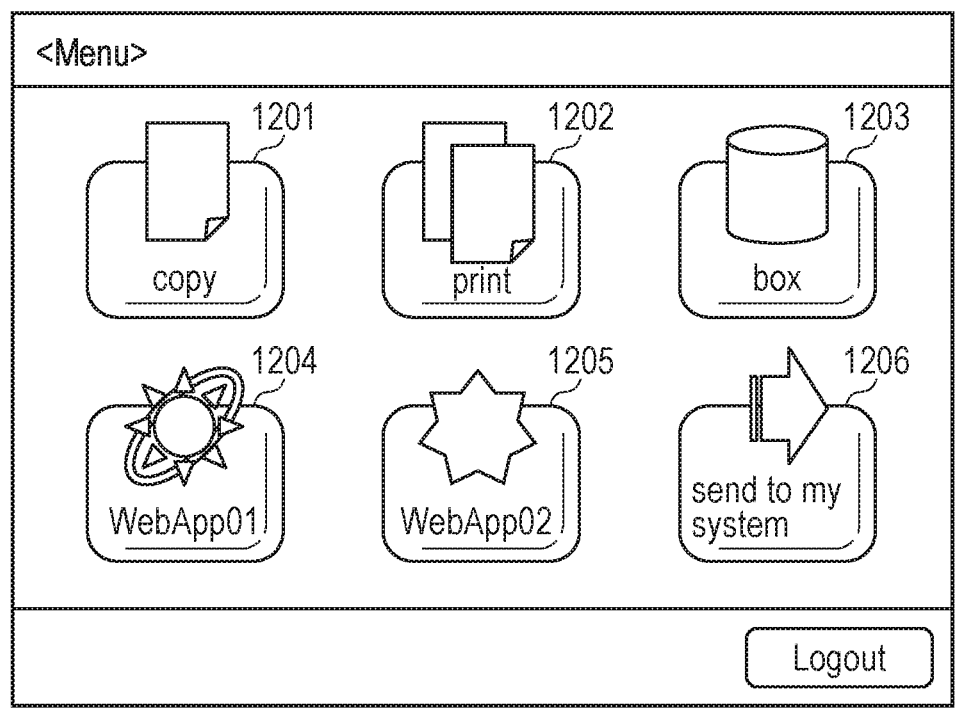
FIG. 12 is a view illustrating an example of a GUI displayed on an operation unit of the MFP according to one or more aspects of the present disclosure.

FIG. 12 is a view illustrating an example of a graphical user interface (GUI; or simply called a user interface) displayed on the operation unit 111 when the menu application 705 of the MFP 110 is invoked while the MFP applications APP711, APP712, and APP713 are installed in the MFP 110 according to the embodiment. GUI buttons 1201, 1202, and 1203 are GUI buttons for invoking an application provided from the beginning in the MFP 110.

A GUI button 1204 is a GUI button for invoking the MFP application for web connection APP711. A GUI button 1205 is a GUI button for invoking the MFP application for web connection APP712. A GUI button 1206 is a GUI button for invoking the local MFP application APP713. As illustrated in FIG. 12, the menu application 705 displays the GUI buttons without distinguishing the type of the MFP application.

The GUI button can be selected only when the license is valid. For example, in a case where the APP712 is installed with a license valid for 60 days, the GUI button 1205 is valid until the 60th day after the installation, but the GUI button 1206 becomes invalid on the 61st day. When the GUI button 1206 becomes invalid, it is impossible to invoke the corresponding MFP application APP712, disabling the connection to the web application.

Processing by Menu Application

Figure 13:
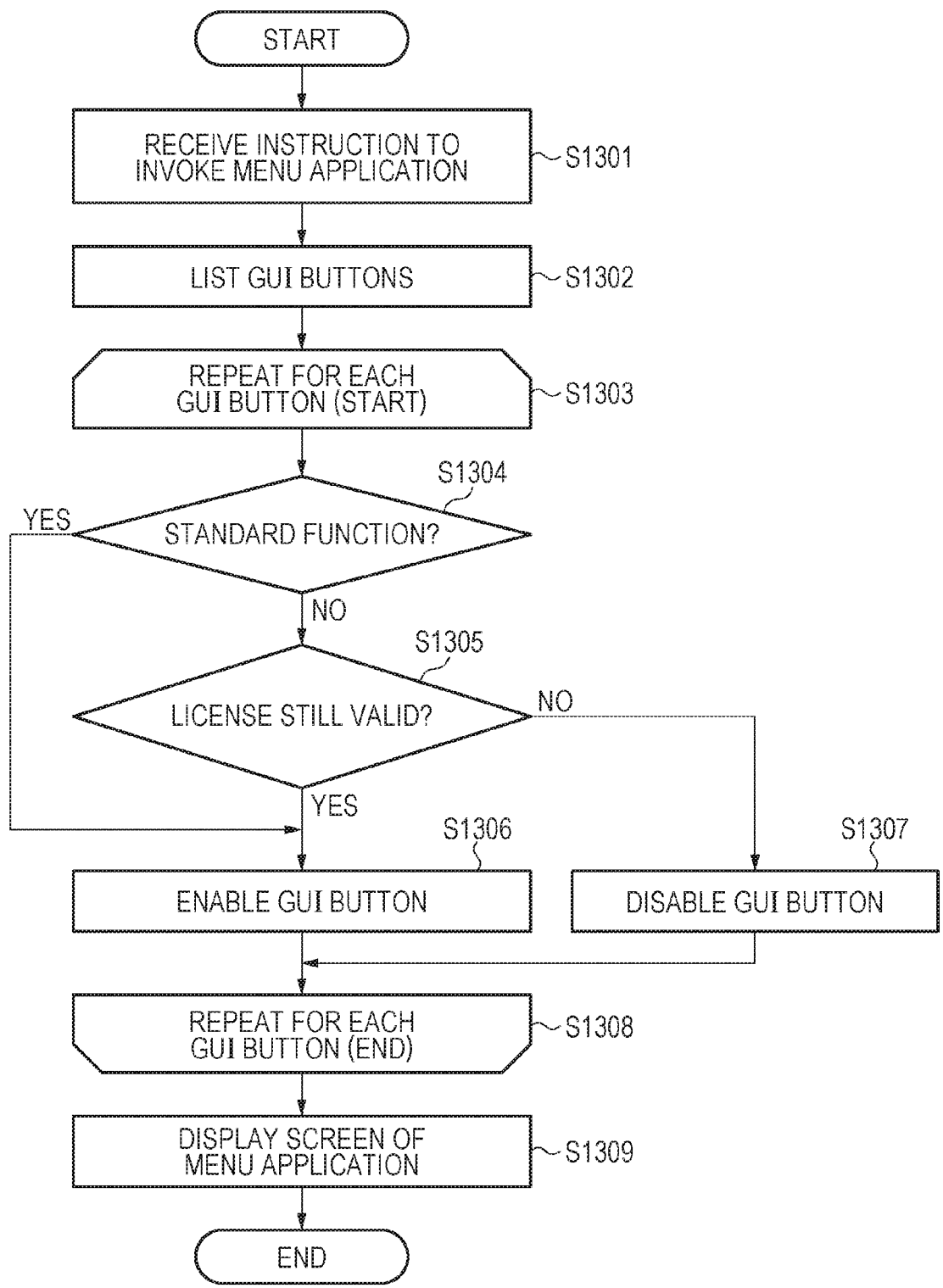
FIG. 13 is a flowchart illustrating an example of processing in the MFP according to one or more aspects of the present disclosure.

FIG. 13 is a flowchart for describing processing performed when the menu application 705 receives an invoking instruction. The menu application 705 confirms the license of the MFP application corresponding to the GUI button and makes it possible to select only the button of the MFP application with a valid license. The CPU 201 reads the program stored in the HDD 204 of the MFP 110 into the RAM 203, analyzes and executes the program, whereby the respective steps of the flowchart in FIG. 13 are executed.

Upon receiving an invoking instruction (step S1301), the menu application 705 lists GUI buttons registered in the menu application 705 (step S1302). Next, the menu application 705 repeats the processing of steps S1303 to S1308 for each GUI button in order to verify the validity of the listed GUI buttons.

The menu application 705 determines whether the GUI button corresponds to an application provided from the beginning (step S1304). If the GUI button corresponds to an application provided from the beginning, the processing proceeds to step S1306. If the GUI button corresponds to an MFP application installed later, the processing proceeds to step S1305. In step S1305, the menu application 705 uses the license information table 720 to determine whether the period of validity of the license of the MFP application corresponding to the GUI button has not expired. If the license is still valid, the processing proceeds to step S1306. If the license is no longer valid, the processing proceeds to step S1307. In step S1306, the menu application enables the GUI button. In step S1307, on the other hand, the menu application disables the GUI button. Examples of the method of disabling the GUI button include hiding the GUI button itself, and displaying the GUI button but making it impossible to press the button. Alternatively, it is possible, after pressing the GUI button, to display a message indicating that the license is no longer valid. When all the GUI buttons have been processed, the menu application 705 advances the processing to step S1309.

Finally, the menu application 705 displays the screen of the menu application illustrated in FIG. 12 on the operation unit 111 and ends the processing (step S1309).

Processing by Local MFP Application

Figure 14:
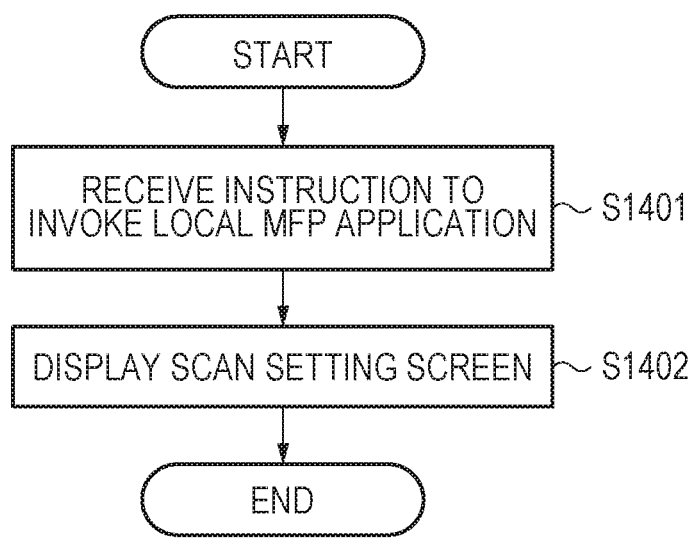
FIG. 14 is a flowchart illustrating an example of processing in the MFP according to one or more aspects of the present disclosure.

FIG. 14 is a flowchart for describing processing performed when the local MFP application receives an invoking instruction from the screen illustrated in FIG. 12. The CPU 201 reads the program stored in the HDD 204 of the MFP 110 into the RAM 203, analyzes and executes the program, whereby the respective steps of the flowchart in FIG. 14 are executed. Here, an example will be described in which the local MFP application APP713 illustrated in FIG. 7 is invoked.

The menu application collaboration unit 811 of the local MFP application receives an invoking instruction from the menu application 705 on which the GUI button has been pressed by the user (step S1401). Next, the screen processing unit 814 displays a scan setting screen, which is the initial screen of the local MFP application APP713, on the operation unit 111 and ends the processing (step S1402).

Invoking Web Application by MFP Application for Web Connection

FIG. 15A is a sequence diagram illustrating the flow of a series of processing when using the web application from the MFP 110. Here, as an example, processing performed when the GUI button 1204 displayed on the menu application 705 is selected by the user will be described. In terms of hardware, the CPU 201 in the MFP 110 as well as the CPU 301 in the web application server 130 executes the procedure of FIG. 15A.

First, upon accepting pressing of the GUI button 1204 by the user (i.e., upon accepting an instruction to access the web application), the menu application 705 of the MFP 110 invokes the MFP application APP711 corresponding to the GUI button 1204 (step S1501). Next, the invoked MFP application APP711 calls up the manifest file reflection unit 838 of the MFP application APP711, and the manifest file reflection unit 838 executes the manifest file reflection processing of the MFP application APP711 (step S1502). If there is the new manifest file 822 of the APP711, the manifest file reflection unit 838 updates the current manifest file 821 with the new manifest file 822. That is, the current setting is updated with the new setting. Next, the MFP application APP711 creates information necessary for calling up the front page of the web application based on the information defined in the manifest file of the MFP application APP711 (step S1503). The information necessary for calling up the front page of the web application includes the device information defined in the device information list 916 and the electronic signature created using the electronic signature key 835. Subsequently, the MFP application APP711 calls up the front page of the web application based on the information created in step S1502 using the web browser 706 to which the SSB setting 915 defined in the manifest file is applied (step S1504). That is, the web browser causes the MFP application APP711 to access the access destination specified by the setting.

Upon receiving the call-up, the web application server 130 verifies the call-up (step S1505). To verify the call-up, for example, the validity of the electronic signature is checked to thereby confirm that the call-up is coming from the MFP 110 in which the MFP application for web connection APP711 is installed. Based on the verification result, the web application server 130 sends a response to the call-up to the MFP 110 (web browser 706) (step S1506). If the verification result is successful, the web application server 130 returns HTML content for configuring a screen necessary for the next operation.

The web browser 706 renders the received HTML and displays a screen on the operation unit 111 (step S1507). Next, upon receiving a screen operation instruction from the user (step S1508), the web browser 706 transmits the corresponding request to the web application server 130 by the HTTP protocol (step S1509).

Upon receiving the request, the web application server 130 processes the request (step S1510) and returns, to the MFP 110 (web browser 706), HTML content for configuring the next screen based on the processing result (step S1511). Thereafter, by repeating steps S1507 to S1511, the processing of the web application and the screen transition are realized.

Furthermore, the web application server 130 transmits a job input request for scan processing or print processing to the MFP 110 according to the processing for the request illustrated in step S1510 (step S1512). Then, when the service provider 707 of the MFP 110 receives the request for scan processing or print processing, the service provider 707 performs scan processing or print processing according to the request (step S1513). Here, prior to executing the job, the service provider 707 requests the service provider collaboration unit 836 of the corresponding APP711 to acquire the manifest file. When acquisition of the manifest file is requested, the service provider collaboration unit 836 of the APP711 transmits the current manifest file 821 of the APP711 to the service provider 707. The service provider 707 determines whether the URL of the requesting web application server 130 matches the front page URL 913 or the context root URL 914 of the current manifest file 821. That is, the service provider 707 determines whether the access destination included in the setting related to the web application matches the sender of the request to the service provider 707. The purpose of this confirmation or determination processing is to prevent a job input request from an unauthorized web application server to the service provider 707 and to accept a job input request only from an authorized web application server. Details of the confirmation processing will be described with reference to FIGS. 19A and 19B. In a case where the URL of the web application server 130 matches the front page URL 913 or the context root URL 914 of the current manifest file 821, the service provider 707 executes the scan processing or print processing requested from the web application server 130. Then, the service provider 707 returns the processing result to the web application server 130 as a response (step S1514). Thereafter, by repeating steps S1512 to S1514, job input processing of the web application can be realized. Note that in the present embodiment, the flow of processing repeats steps S1512 to S1514 after steps S1507 to S1511 end. However, the processing of steps S1512 to S1514 may be repeatedly executed in step S1510, or may be executed at any timing after step S1510.

FIG. 15B is a sequence diagram illustrating a flow of a series of processing for the PC 140 to instruct the setting change of the MFP application for web connection of the MFP 110. Here, as an example, processing performed when a change of the MFP application for web connection 711 is selected by the user will be described. The setting change processing of FIG. 15B is performed at any timing different from the web application processing and the job input processing of FIG. 15A.

First, the web browser 601 of the PC 140 accepts a call-up instruction designating the setting change screen URL of the MFP application for web connection of the MFP 110 from the user (step S1521). The web browser 601 transmits, to the MFP 110, a request for the setting change screen of the MFP application for web connection according to the designated URL (step S1522). Upon accepting the request, the MFP 110 calls up the manifest file change unit 837 of the MFP application for web connection 711 according to the URL. The manifest file change unit 837 of the MFP application for web connection 711 checks whether there is the new manifest file 822 of the MFP application for web connection 711. In a case where there is the new manifest file 822, the manifest file change unit 837 creates the setting change screen of the MFP application for web connection based on the information of the new manifest file 822. In a case where there is no new manifest file 822, on the other hand, the manifest file change unit 837 creates the setting change screen of the MFP application for web connection based on the information of the current manifest file 821. Details of the setting change screen of the MFP application for web connection will be described below with reference to FIG. 22. Then, the manifest file change unit 837 returns, to the PC 140, the created setting change screen of the MFP application for web connection as a response (step S1523). The PC 140 displays, on a display unit (not illustrated) thereof through the screen processing unit 603 and the display unit I/F 307, the setting change screen of the MFP application for web connection received by the web browser 601 from the MFP 110 (step S1524). The web browser 601 accepts a setting change instruction as a screen operation on the setting change screen of the MFP application for web connection from the user (step S1525). The web browser 601 transmits, to the MFP 110, the contents of the setting change instruction input by the user on the setting change screen of the MFP application for web connection as a setting change request (step S1526). The manifest file change unit 837 in the MFP application for web connection 711 of the MFP 110 changes the setting according to the contents of the setting change request received from the PC 140. The manifest file change unit 837 checks whether there is the new manifest file 822 of the MFP application for web connection 711. In a case where there is the new manifest file 822, the manifest file change unit 837 updates the information of the new manifest file 822 with the contents of the received setting change request. In a case where the new manifest file 822 does not exist, on the other hand, the manifest file change unit 837 creates the new manifest file 822 based on the received setting change contents (step S1527). Then, the manifest file change unit 837 creates a setting change result screen, transmits the created screen to the PC 140 as a response, and the processing ends (step S1528).

In general, the URL of the web application server or the web application may be changed due to circumstances such as a change in the service name of the web application server or a change in the server configuration. In that case, it is necessary for a device management user to change the setting of the MFP application for web connection of the MFP 110 according to the change of the web application server or the web application. This is because, unless the setting of the MFP 110 is changed, it may be impossible for the web browser 706 to correctly access the web application. This is also because, when a job is input from the web application server to the service provider 707, the service provider 707 determines that the URL of the web server is invalid and issues an error.

For example, it is assumed that the URL of the web application is set as specified in the manifest file of FIG. 9B. That is, it is assumed that the front page URL 913 is set to "http://www.canon.com/mypotal?app=webapp01". It is also assumed that the context root URL 914 is set to "http://www.canon.com/webapp01". In this case, when the user presses the GUI button 1204, the MFP application for web connection 711 accesses the URL "http://www.canon.com/mypotal?app=webapp01" using the web browser 706. The URL for inputting a job from the web application server to the service provider 707 is "http://www.canon.com/webapp01". In this case, the setting of the web application server 130 matches the setting of the MFP application for web connection 711. Therefore, the web browser 706 successfully accesses the web application, and the correct screen is displayed on the web browser 706. The URL for inputting a job from the web application server to the service provider 707 is "http://www.canon.com/webapp01". Therefore, at the time of confirming the URL of the web server by the service provider 707, the URLs match successfully, and the job is executed by the service provider 707.

Meanwhile, it is assumed that the URL of the web application server has been changed to "http://www01.canon.jp/mypotal01?app=webapp01". At this time, if the setting of the MFP application for web connection is not changed, the URL accessed by the web browser 706 is still "http://www.canon.com/mypotal?app=webapp01". Since this URL is different from "http://www01.canon.jp/mypotal01?app=webapp01", the web browser 706 fails to access the web application server. The URL for inputting a job from the web application server to the service provider 707 is "http://www01.canon.jp/mypotal01? app=webapp01". Since this URL is different from "http://www.canon.com/webapp01", the URLs do not match at the time of checking the URL of the web server by the service provider 707, and the service provider 707 does not execute the job due to the failure. Therefore, it is necessary to change the setting of the MFP application for web connection according to the setting change of the web application server 130. In such a case, the setting is changed according to the procedure of FIG. 15B, and the changed setting is stored in the new manifest file 822.

The MFP 110 is normally used by a general user, and there is a case where a large number of MFPs 110 are managed. Therefore, in a case where the device management user changes the setting of the MFP 110, it is necessary to avoid directly operating the MFP 110 and to make it possible to remotely change the setting of the MFP application for web connection at any timing. In a case where a device administrator changes the setting, it is necessary to make it possible to change the setting at any timing any number of times. The procedure of FIG. 15B satisfies the requirement.

Furthermore, as described in FIG. 15B, the setting change processing in FIG. 15B is performed asynchronously with the web application processing or the job input processing in FIG. 15A, i.e., at any timing different from the timing of such processing. As a result, during the life cycle processing in the web application server 130 and the MFP 110, the setting is changed at any timing within the life cycle. For example, it is assumed that the setting of the MFP application for web connection is changed halfway, after the settings of the web application and the MFP application for web connection have matched and the processing has been performed normally until the web application processing. In that case, in a case where a job is input from the web application, the URL of the web server does not match the setting of the MFP application for web connection when the service provider 707 checks the URL of the web server at the time of the job input, resulting in an error. Therefore, the MFP 110 preferably determines, as accurately as possible, the break between the life cycle processing in the web application server 130 and that in the MFP 110 and reflects the setting. However, since the web application controls the timing at which the web server inputs a job, there is a problem that it is difficult for the MFP 110 to determine the job input timing.

In the present embodiment, the setting change processing (step S1527) is at the timing when the user performs the setting change operation (step S1525). In other words, the setting change processing is at any timing asynchronous with the life cycle processing in the web application server 130 and the MFP 110 illustrated in FIG. 15A. However, the changed setting is actually reflected and becomes effective at the timing at which the setting reflection processing is performed in step S1502 immediately after step S1501 in which the MFP application for web connection receives the execution instruction from the user. By separating the setting change from the setting reflection as in the processing of FIGS. 15A and 15B, it is possible to accept the setting change from the user even during the series of life cycles including the web application processing and the job input processing. The setting change contents set by the user at the timing of step S1502 are reflected at the timing of starting the life cycles based on determination that the timing of the execution instruction of the MFP application for web connection is highly likely to be the break between the life cycles. By reflecting the setting at such a break between life cycles, the same setting is used between the life cycles implemented by the web application server 130 and the MFP 110. Therefore, it is possible to maintain the consistency of the setting between the life cycles. Details of FIG. 15B will be described below with reference to FIGS. 21 to 23.

Reflecting New Setting by MFP Application for Web Connection

Figure 16:
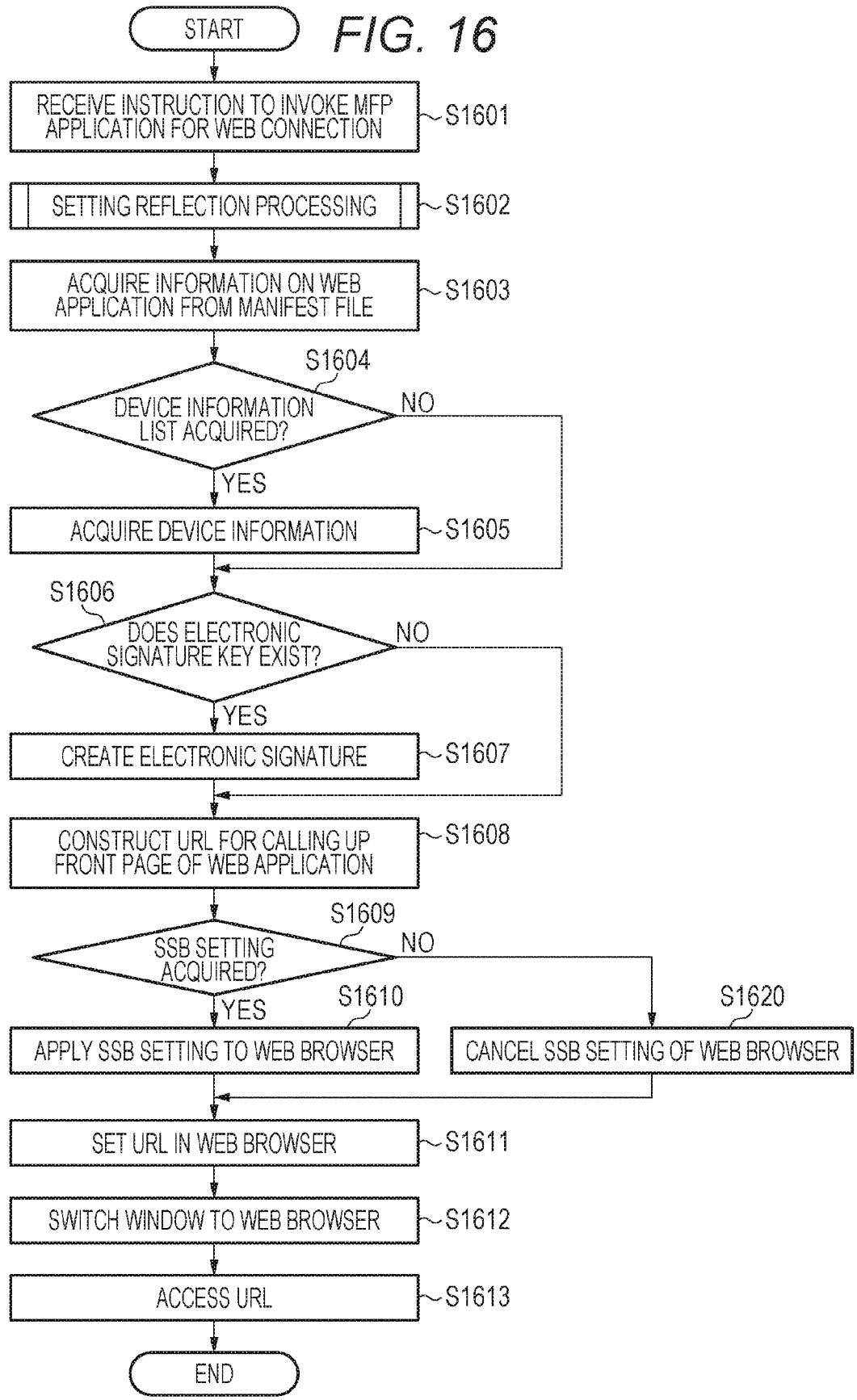
FIG. 16 is a flowchart illustrating an example of processing in the MFP according to the embodiment.

FIG. 16 is a flowchart for describing processing performed when the MFP application for web connection calls up the front page of the web application. The CPU 201 reads the program stored in the HDD 204 of the MFP 110 into the RAM 203, analyzes and executes the program, whereby the respective steps of the flowchart in FIG. 16 are executed.

The flowchart of FIG. 16 is a detailed description of the processing of steps S1501 to S1504 in FIG. 15A. Step S1501 in FIG. 15A corresponds to step S1601 in FIG. 16. Step S1502 in FIG. 15A corresponds to step S1602 in FIG. 16. Step S1503 in FIG. 15A corresponds to steps S1603 to S1612 in FIG. 16. Step S1504 in FIG. 15A corresponds to step S1613 in FIG. 16.

The menu application collaboration unit 831 of the MFP application for web connection receives an invoking instruction from the menu application 705 on which the GUI button has been pressed by the user (step S1601). Next, if there is the new manifest file 822, the manifest file reflection unit 838 reflects the contents of the new manifest file 822 in the current manifest file 821 (step S1602). Details of the processing in step S1602 will be described below with reference to FIG. 17A. Next, the web browser collaboration unit 832 acquires the front page URL 913, the SSB setting 915, and the device information list 916, which are the information of the web application, from the current manifest file 821 (step S1603). Depending on the MFP application for web connection, the SSB setting 915 and the device information list 916 may not be defined in the current manifest file 821. In that case, only the defined information is acquired.

If the device information list 916 has been acquired in step S1603, the device information acquisition unit 833 acquires the device information listed in the device information list 916 (steps S1604 and S1605). According to the current manifest file 821 illustrated in FIG. 9B, the device information acquisition unit 833 acquires device information corresponding to user_id, device_id, and device model. In addition, the device information acquisition unit 833 acquires device information corresponding to encrypt_pdf and print_service_ver. user_id represents the ID of the user who has logged in to the MFP 110. device_id represents the device ID of the MFP 110. device_model represents the model of the MFP 110. encrypt_pdf represents the installation status of an encrypted PDF option. print_service_ver represents a software version of a web service module for requesting printing from the web application to the MFP 110. The device information list 916 in FIG. 9B is an example, and the device information that can be acquired is not limited to these.

Next, in a case where the electronic signature key 835 is included in the MFP application for web connection, the signature processing unit 834 creates an electronic signature (steps S1606 and S1607). The signature processing unit 834 calculates a message digest (HMAC value) based on a hash function using a signature text string as a message and the electronic signature key 835 as a private key, and sets the message digest as an electronic signature. The signature text string is obtained by concatenating the front page URL 903, the system time (hereinafter referred to as time stamp) of the MFP 110, and optionally the device information acquired in step S1605 into a text string.

Subsequently, the web browser collaboration unit 832 constructs the URL for calling up the front page of the web application (step S1608). If there is the device information acquired in step S1605, the web browser collaboration unit 832 adds the device information as a query text string to the front page URL 913. Furthermore, if there are the time stamp and the electronic signature acquired in step S1607, the web browser collaboration unit 832 also adds these pieces of information as the query text string to the front page URL 913.

The web browser collaboration unit 832 determines whether the SSB setting 915 has been acquired (step S1609). If the SSB setting has not been acquired, the web browser collaboration unit 832 cancels the SSB setting of the web browser 706 and initializes various settings of the web browser (step S1620). If the SSB setting has been acquired in step S1603, on the other hand, the web browser collaboration unit 832 applies the SSB setting to the web browser 706 (step S1610). According to the SSB setting 915 illustrated in FIG. 9B, the web browser collaboration unit 832 applies the SSB setting corresponding to cookie, address_bar, cache, and warn_not_exist_rootcert to the web browser 706. cookie=on means to enable the cookie function. address_bar=off means to hide the address bar for entering the URL from the UI of the web browser. cache=off means not to use the cache. warn_not_exist_rootcert=on means to enable warning display when there is no root certificate during encrypted communication. The SSB setting 915 in FIG. 9B is an example, and the SSB setting that can be designated is not limited to the SSB setting 915 in FIG. 9B.

Next, the web browser collaboration unit 832 sets the URL constructed in step S1607 as the connection destination in the web browser 706 (step S1611). The web browser collaboration unit 832 switches the display of the operation unit 111 from the menu application 705 to a GUI window of the web browser 706 (step S1612). In order to call up the front page of the web application, the web browser 706 displayed on the operation unit 111 accesses the URL set in step S1611 (step S1613).

By executing the above processing, the MFP application for web connection corresponding to the GUI button instructed by the menu application 705 can call up the front page of the web application. Furthermore, immediately after accepting the invoking instruction of the MFP application for web connection from the user in step S1601, the contents of the new setting set in response to the user's request in step S1527 can be reflected in the current setting of the MFP application for web connection in step S1602. It is highly likely that there is a break in the life cycle between the MFP 110 and the web application server 130 immediately after the user invokes the MFP application for web connection. At this time, the MFP 110 can update the contents of the current manifest file 821 with the information of the new manifest file 822. In this manner, the setting timing and the reflection timing are separated, and the setting can be reflected at the timing with a high possibility of being the break in the life cycle between the MFP 110 and the web application server 130. By keeping the consistency of the setting within the life cycle, it is possible to reflect the setting while reducing the influence on the life cycle and to change the setting at arbitrary timing of the device administrator.

Figure 17:
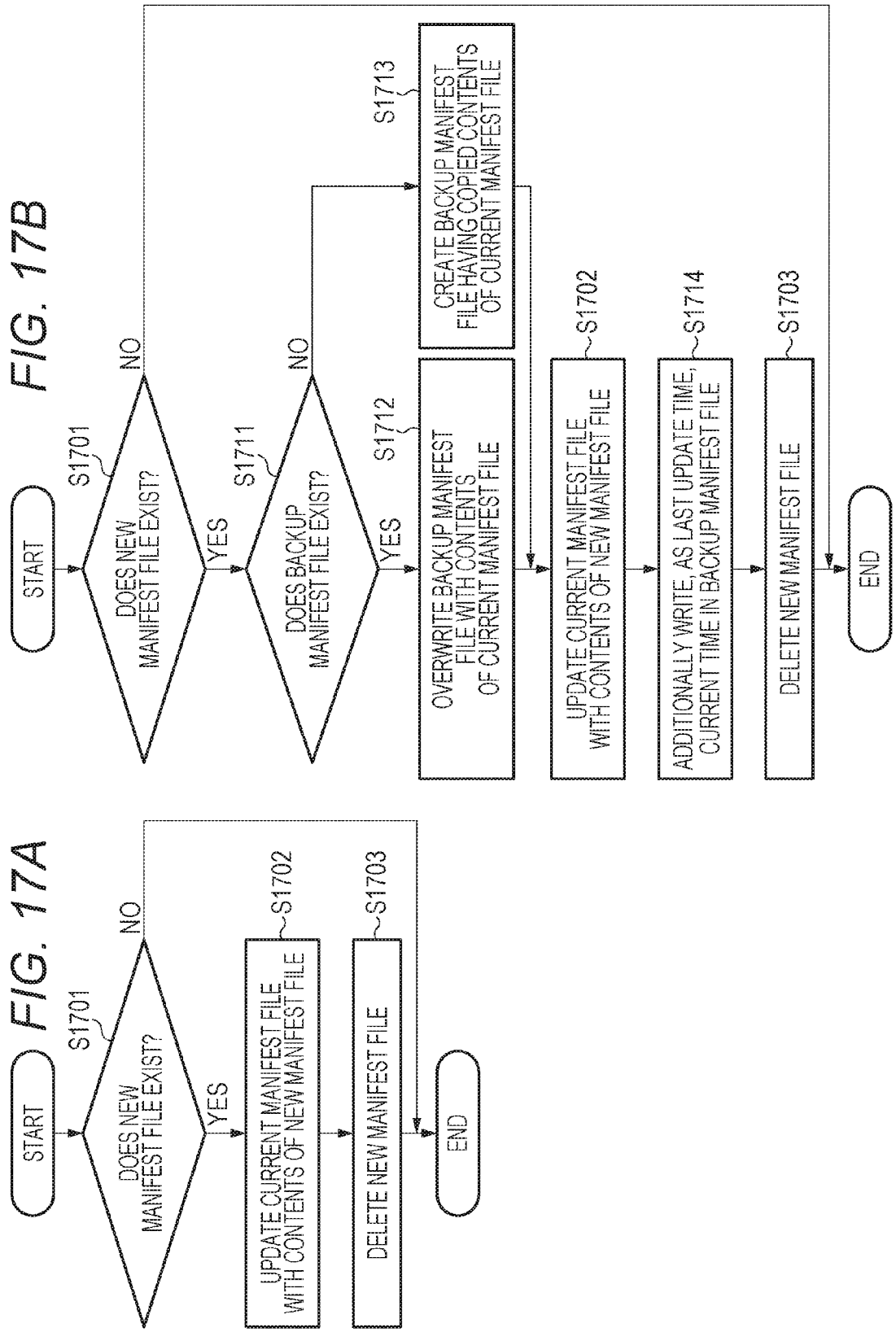
FIGS. 17A and 17B are flowcharts illustrating an example of processing in the MFP according to one or more aspects of the present disclosure.

FIG. 17A is a flowchart for describing processing performed when the MFP application for web connection reflects the setting contents of the new manifest file in the contents of the current manifest file. The CPU 201 reads the program stored in the HDD 204 of the MFP 110 into the RAM 203, analyzes and executes the program, whereby the respective steps of the flowchart in FIG. 17A are executed.

The flowchart of FIG. 17A is a detailed description of the processing of step S1602 in FIG. 16. Step S1602 in FIG. 16 corresponds to steps S1701 to S1703 in FIG. 17A.

The manifest file reflection unit 838 of the MFP application for web connection 711 determines whether the new manifest file 822 exists in the MFP application for web connection 711 (step S1701). In a case where the new manifest file 822 does not exist, the processing ends. In a case where the new manifest file 822 exists, on the other hand, the manifest file reflection unit 838 updates the setting contents of the current manifest file 821 with the contents of the new manifest file 822 (step S1702). Then, the manifest file reflection unit 838 deletes the new manifest file (step S1703), and the processing ends.

By executing the above processing, the setting contents of the new manifest file 822 can be reflected in the current manifest file 821.

Processing of Request by Web Application Server

Figure 18:
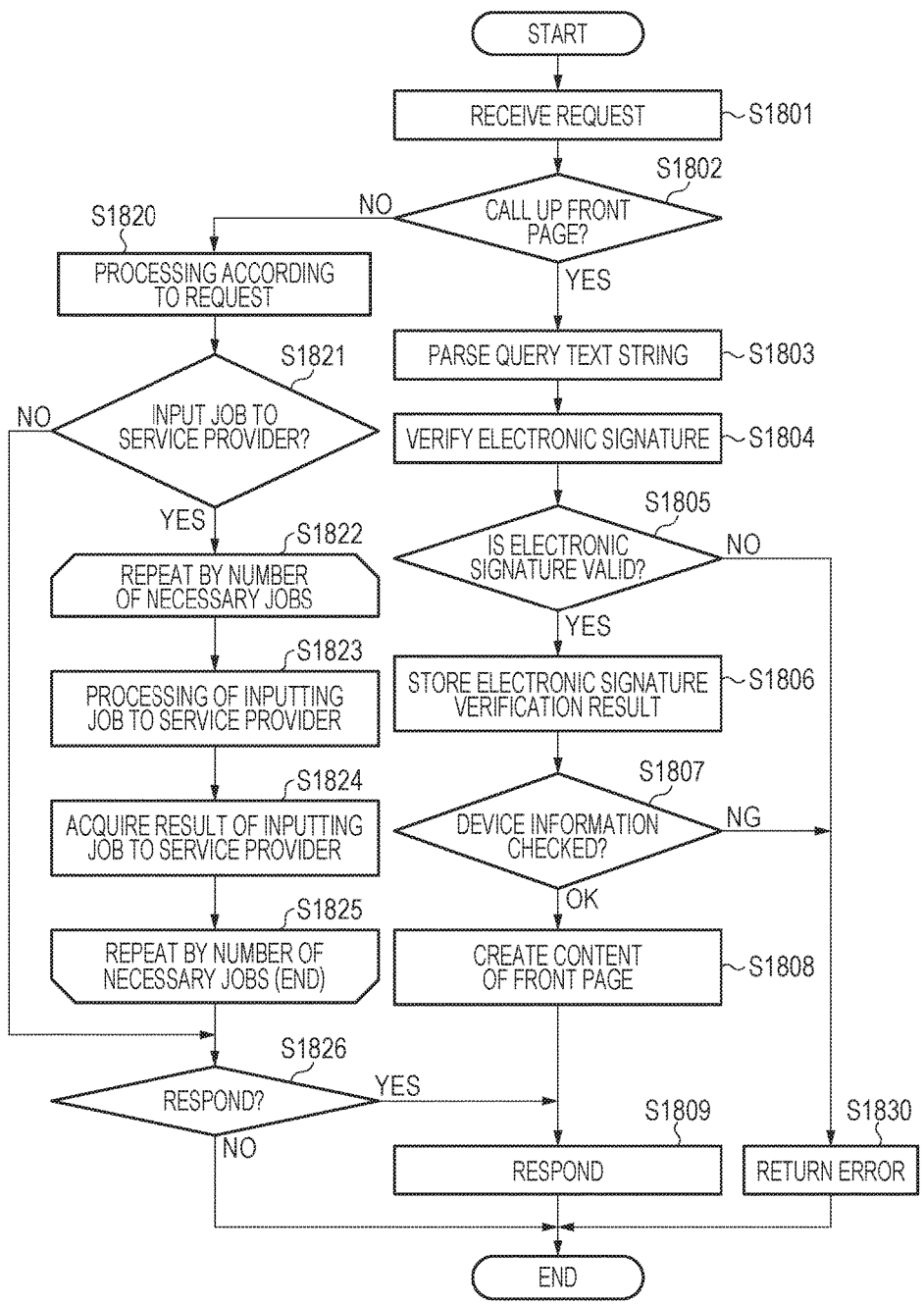
FIG. 18 is a flowchart illustrating an example of processing in the web application server according to one or more aspects of the present disclosure.

FIG. 18 is a flowchart for describing processing executed when the web application server 130 receives a request by HTTP from the MFP 110. The CPU 301 reads the program stored in the HDD 304 of the web application server 130 into the RAM 302, analyzes and executes the program, whereby the respective steps of the flowchart in FIG. 18 are executed.

The flowchart of FIG. 18 is a detailed description of the processing of steps S1504 to S1506, steps S1509 to S1511, and steps S1512 to S1514 in FIG. 15A. Step S1504 in FIG. 15A corresponds to steps S1801 to S1802 in FIG. 18. Step S1505 in FIG. 15A corresponds to steps S1803 to S1808 in FIG. 18. Step S1506 in FIG. 15A corresponds to step S1809 in FIG. 18. Step S1509 in FIG. 15A corresponds to steps S1801 to S1802 in FIG. 18. Step S1510 in FIG. 15A corresponds to step S1820 in FIG. 18. Step S1511 in FIG. 15A corresponds to step S1809 in FIG. 18. Step S1512 in FIG. 15A corresponds to steps S1821 to S1823 and step S1825 in FIG. 18. Step S1514 in FIG. 15A corresponds to step S1824 in FIG. 18.

First, the communication unit 1001 accepts a request by HTTP from the MFP 110 (step S1801). Next, the web application processing unit 1002 determines whether the accepted request is about calling up a front page. If the request is about calling up the front page, the processing proceeds to step S1803; otherwise, the processing proceeds to step S1820 (step S1802).

In step S1803, the web application processing unit 1002 analyzes the query text string included in the request received in step S1801 and takes out each item. In the present embodiment, the following description will be given assuming that the items of the electronic signature, the time stamp, and the device information have been acquired.

Next, the signature verification unit 1003 verifies the electronic signature extracted in step S1803 (step S1804). Specifically, the signature verification unit 1003 calculates a message digest based on a hash function using a signature text string as a message and the electronic signature key 1004 as a private key. If the value of the message digest matches the electronic signature extracted in step S1803, the signature verification unit 1003 determines the signature as valid (step S1805). The signature text string is obtained by concatenating the request URL received in step S1801, and the time stamp and device information extracted in step S1803 into a text string. That is, the web application server 130 performs the same processing as the processing performed by the MFP 110 to create the electronic signature in step S1607 of FIG. 16, and the validity of the electronic signature is confirmed based on whether the processing results match. In a case where the electronic signature key 835 of the MFP 110 is the same as the electronic signature key 1004 of the web application server 130, the results match. If the results match, the request can be regarded as one from the MFP 110 in which the MFP application for web connection is installed.

If the electronic signature is invalid, the web application processing unit 1002 returns an error to the request source and ends the processing (step S1830). If the electronic signature is valid, on the other hand, the web application processing unit 1002 stores the verification result of the electronic signature in association with the session (step S1806). By storing the verification result of the electronic signature in association with the session, it becomes possible to confirm that the communication comes from the MFP 110 in which the MFP application for web connection is installed in the processing of subsequent requests. Depending on the web application, the request source may be checked using other information instead of an electronic signature. In that case, steps S1804 to S1806 are skipped, and the alternative information is checked. For example, an IP address of the request source or a user agent of the web browser may be checked, or the device information extracted in step S1803 may be checked.

In step S1807, the web application processing unit 1002 checks the device information extracted in step S1803. This step is unnecessary if the web application does not require the device information of the MFP 110. If the web application requires the device information of the MFP 110, on the other hand, the web application processing unit 1002 checks the device information and, if there is a problem, returns an error to the request source and ends the processing (step S1830). If there is no problem in the device information, on the other hand, the web application processing unit 1002 advances the processing to next step S1808. Examples of checking the device information include "confirmation of user ID", "confirmation of valid option function", and "confirmation of software version". For example, if all the items to be checked satisfy the requirement, it is determined that there is no problem, and if there is any item that does not satisfy the requirement, it is determined that there is a problem.

In step S1808, the web application processing unit 1002 creates HTML content for displaying the front page. Finally, the communication unit 1001 returns the HTML content created in step S1808 to the MFP 110 and ends the processing (step S1809).

Meanwhile, in step S1820, the web application processing unit 1002 performs processing corresponding to the request received in step S1801. For example, if the request is for calling up the scan setting screen, the web application processing unit 1002 creates HTML constituting the scan setting screen. Then, the web application processing unit 1002 determines whether to input a job to the service provider 707 of the MFP 110 as the processing corresponding to the request (step S1821). In a case where the web application processing unit 1002 determines to input a job to the service provider 707, the processing proceeds to step S1822. In a case where the web application processing unit 1002 determines not to input a job to the service provider 707, on the other hand, the processing proceeds to step S1826.

The web application processing unit 1002 repeats steps S1823 to S1824 by the number of jobs input to the service provider 707 (steps S1822 and S1825). The web application processing unit 1002 inputs a scan processing job or a print processing job to the service provider 707 of the MFP 110 via the communication unit 1001 (step S1823), and acquires a job input result from the service provider 707 (step S1824). The web application processing unit 1002 determines whether to return, to the MFP 110, the processing result of step S1820 and steps S1822 to S1825 (step S1826). In a case where the web application processing unit 1002 determines to return the processing result to the MFP 110, the communication unit 1001 returns the processing result in step S1820 to the MFP 110 and ends the processing (step S1809). In a case where the web application processing unit 1002 determines not to return the processing result to the MFP 110, on the other hand, the processing ends without a response.

Note that in FIG. 18, the processing of steps S1821 to S1825 is executed immediately after step S1820, but the processing of steps S1821 to S1825 may be executed at arbitrary timing after step S1820. For example, the processing of steps S1821 to S1825 may be executed as batch processing at a preset time.

Processing of Job by Service Provider

Figure 19A:
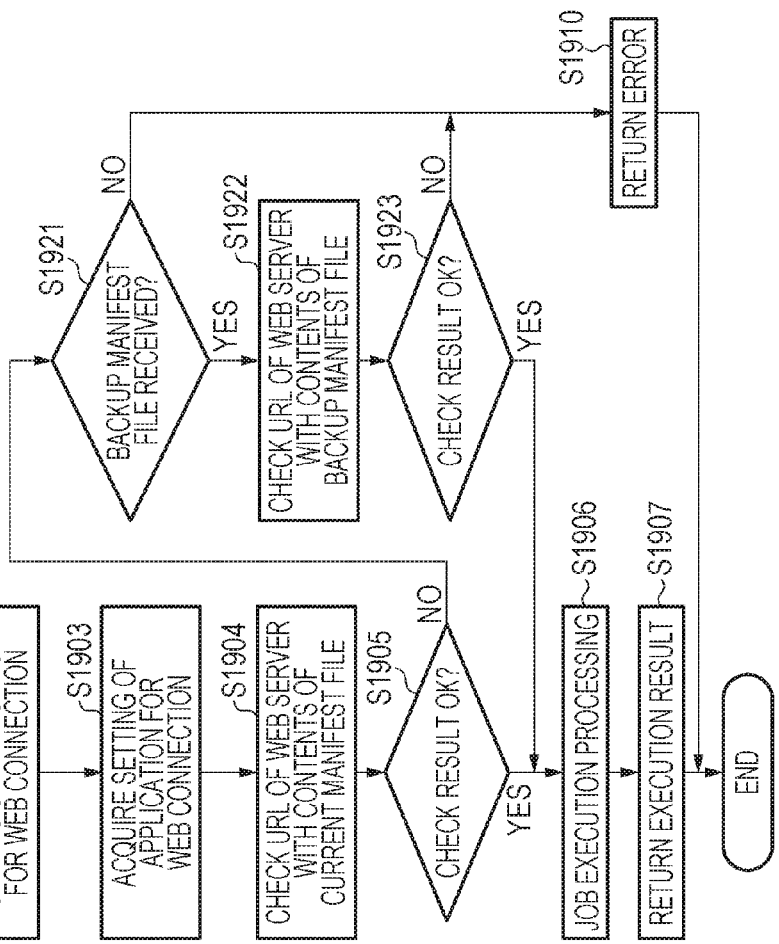
FIGS. 19A and 19B are flowcharts illustrating an example of processing in the MFP according to one or more aspects of the present disclosure.

FIG. 19A is a flowchart for describing processing performed when the service provider 707 of the MFP 110 invokes the job input processing in response to a request from the web application server 130. The CPU 201 reads the program stored in the HDD 204 of the MFP 110 into the RAM 203, analyzes and executes the program, whereby the respective steps of the flowchart in FIG. 19A are executed.

The flowchart of FIG. 19A is a detailed description of the processing of steps S1512 to S1514 in FIG. 15A. Step S1512 in FIG. 15A corresponds to step S1901 in FIG. 19A. Step S1513 in FIG. 15A corresponds to steps S1902 to S1906 in FIG. 19A. Step S1514 in FIG. 15A corresponds to steps S1907 and S1910 in FIG. 19A.

The service provider 707 accepts a job input request from the web application server 130 (step S1901). The service provider 707 requests the service provider collaboration unit 836 of the MFP application for web connection 711 to acquire setting information, that is, acquire the current manifest file 821 (step S1902). The service provider 707 acquires the current manifest file 821 as setting information from the service provider collaboration unit 836 (step S1903). The service provider 707 checks the contents of the current manifest file 821 and the contents of the job input acquired in step S1901 (step S1904).

Here, details of the processing in step S1904 will be described. In step S1904, it is confirmed whether the domains and first directories each match between the URL of the web application server 130 and the front page URL 913 or the context root URL 914 of the current manifest file 821. Here, it is assumed that the front page URL 913 and the context root URL 914 of the current manifest file 821 are set as illustrated in FIG. 9B. Specifically, the front page URL 913 is "http://www.canon.com/mypotal?app=webapp01", and the context root URL 914 is "http://www.canon.com/webapp01". At this time, as a first case, it is assumed that the URL of the web server is "http://www.canon.com/mypotal/jobOperation". In this case, the service provider 707 first compares the URL of the web application server 130 with the front page URL 913. The domain of the web application server 130 is "www.canon.com", and the domain of the front page URL 913 is "www.canon.com". It is thus determined that both domains match. Next, the first directory of the web application server 130 is "mypotal", and the first directory of the front page URL 913 is "mypotal", too. Both first directories thus match. Since the domains and the first directories each match between the URL of the web application server 130 and the front page URL 913, in step S1904, the service provider 707 determines that the URL confirmation processing is successful.

Next, as a second case, it is assumed that the URL of the web server is "http://www.canon.com/webapp01/Control". In this case, the service provider 707 first compares the URL of the web application server 130 with the front page URL 913. The domain of the web application server 130 is "www.canon.com", and the domain of the front page URL 913 is "www.canon.com". It is thus determined that both domains match. Next, the first directory of the web application server 130 is "webapp01", the first directory of the front page URL 913 is "mypotal", and they do not match. In this case, the service provider 707 then compares the URL of the web application server 130 with the context root URL 914. The domain of the web application server 130 is "www.canon.com", and the domain of the context root URL 914 is "www.canon.com". It is thus determined that the domains match. Next, the first directory of the web application server 130 is "webapp01", the first directory of the context root URL 914 is "webapp01", and the first directories match. As a result, since the domains and the first directories each match between the URL of the web application server 130 and the context root URL 914, in step S1904, the service provider 707 determines that the URL confirmation processing is successful.

Next, as a third case, it is assumed that the URL of the web server is "http://www01.canon.jp/mypotal/jobOperation". In this case, the service provider 707 first compares the URL of the web application server 130 with the front page URL 913. The domain of the web application server 130 is "www01.canon.jp", the domain of the front page URL 913 is "www.canon.com", and the domains do not match. Next, the service provider 707 compares the URL of the web application server 130 with the context root URL 914. The domain of the web application server 130 is "www01.canon.jp", the domain of the context root URL 914 is "www.canon.com", and the domains do not match. Therefore, since the URL of the web application server 130 matches neither the domain of the front page URL 913 nor the domain of the context root URL 914, the service provider 707 determines in step S1904 that the URL confirmation processing ends in an error.

Next, as a fourth case, it is assumed that the URL of the web server is "http://www.canon.com/serv/Oper". In this case, the service provider 707 first compares the URL of the web application server 130 with the front page URL 913. The domain of the web application server 130 is "www.canon.com", and the domain of the front page URL 913 is "www.canon.com". It is thus determined that both domains match. Next, the first directory of the web application server 130 is "sere", the first directory of the front page URL 913 is "mypotal", and they do not match. Next, the service provider 707 compares the URL of the web application server 130 with the context root URL 914. The domain of the web application server 130 is "www.canon.com", and the domain of the context root URL 914 is "www.canon.com". It is thus determined that the domains match. Next, the first directory of the web application server 130 is "sere", the first directory of the context root URL 914 is "webapp01", and the first directories do not match. Therefore, since the URL of the web application server 130 matches neither the first directory of the front page URL 913 nor the first directory of the context root URL 914, the service provider 707 determines in step S1904 that the URL confirmation processing ends in an error.

In this manner, if the domains and the first directories each match between the URL of the web application server 130 and the front page URL 913 and/or between the URL of the web application server 130 and the context root URL 914, the URL confirmation in step S1905 is determined to be successful. If not successful, the confirmation is determined to be a failure. The purpose of comparing the URL of the web application server 130 with the front page URL 913 and the context root URL 914 is to prevent an unauthorized job input to the service provider 707 from the unauthorized web application server 130. Another purpose is to accept a job input only from the authorized web application server 130. The purpose of separating the URL to be compared into the front page URL 913 and the context root URL 914 is to deal with a case where the URL of the authentication screen and the URL of the actual web application processing are separated. In the configuration of a typical web application server, in many cases, the front page is an authentication screen, and the URL of the authentication screen and the URL of the actual web application processing thereafter are separated. Therefore, the purpose of separating the URL is to deal with such case as well. The purpose of comparing the front page URLs 913 and the context root URLs 914 between the web application server 130 and the current manifest file 821 is to maintain consistency within the life cycle of the processing between the web application server 130 and the MFP 110. It should be noted that the URL confirmation processing in the present embodiment is merely an example, and the processing may include processing of confirming only the domain among the URL, processing of confirming a second or subsequent directory in addition to the domain and the first directory, and processing of confirming whether the domains, directories and other items completely match.

After the confirmation processing in step S1904, the service provider 707 determines whether the URL confirmation processing in step S1904 is successful, that is, whether the web application server 130 has been successfully compared with the front page URL 913 or the context root URL 914 of the current manifest file 821 (step S1905). In a case where the service provider 707 determines that the URL confirmation processing in step S1904 is successful, the service provider 707 executes the input job in step S1906. For example, in a case where the input job is a scan job, the service provider 707 executes scan processing by the scanner unit 112 through the scanner I/F 207. In a case where the input job is a print job, the service provider 707 executes print processing by the printer unit 113 through the printer I/F 209 (step S1906). The service provider 707 returns the job execution result in step S1906 to the web application server 130, and the processing ends (step S1907). In a case where the result of the URL confirmation processing in step S1905 is an error, on the other hand, the service provider 707 returns an error to the web application server 130 and the processing ends (step S1910).

Figure 20A:
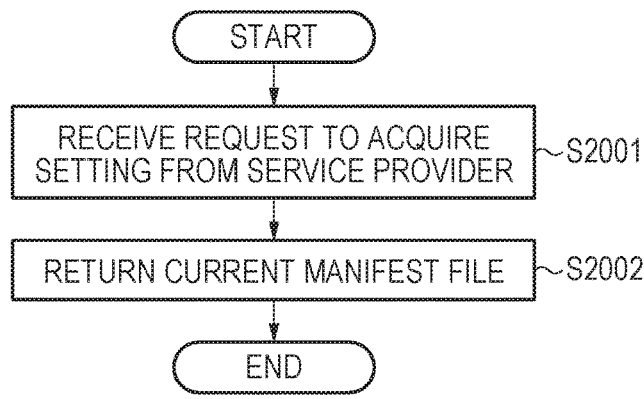
FIGS. 20A and 20B are flowcharts illustrating an example of processing in the MFP according to one or more aspects of the present disclosure.

FIG. 20A is a flowchart for describing processing performed when the service provider collaboration unit 836 of the MFP 110 returns the current manifest file 821 in response to a request from the service provider 707. The CPU 201 reads the program stored in the HDD 204 of the MFP 110 into the RAM 203, analyzes and executes the program, whereby the respective steps of the flowchart in FIG. 20A are executed.

The service provider collaboration unit 836 receives a current manifest file acquisition request from the service provider 707 (step S2001). The current manifest file acquisition request corresponds to the setting acquisition request issued in step S1902 of FIG. 19A. In response to the request, the service provider collaboration unit 836 returns, to the service provider 707, the current manifest file 821 in the MFP application for web connection 711 (step S2002), and the processing ends. The service provider 707 receives the response in step S1903.

Change Setting of MFP Application for Web Connection from PC 140 to MFP

Figure 21:
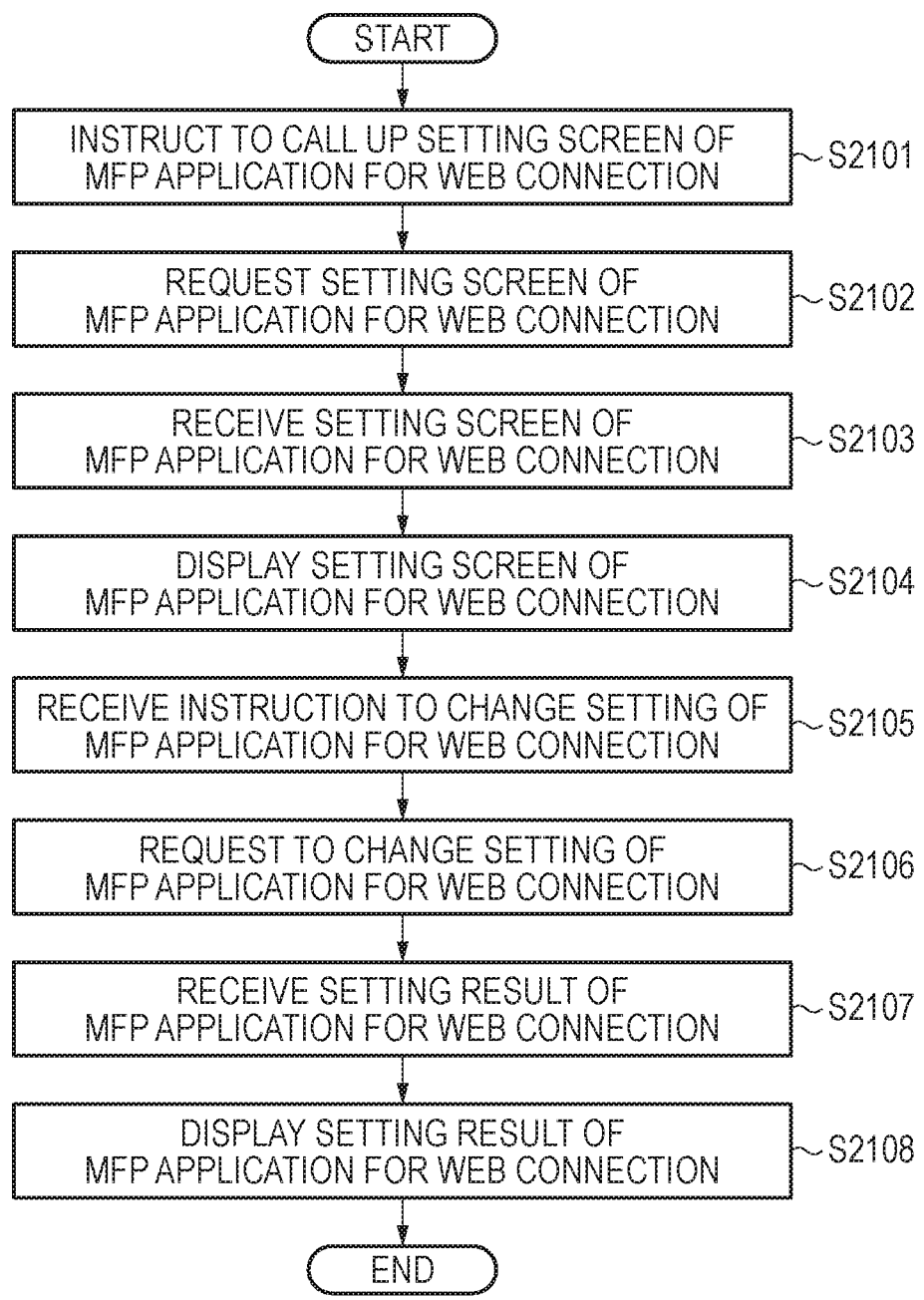
FIG. 21 is a flowchart illustrating processing of requesting a setting change of the MFP application for web connection by the PC according to one or more aspects of the present disclosure.

FIG. 21 is a flowchart for describing processing performed when the PC 140 requests the MFP 110 to change setting of the MFP application for web connection. The CPU 301 reads the program stored in the HDD 304 of the PC 140 into the RAM 302, analyzes and executes the program, whereby the respective steps of the flowchart in FIG. 21 are executed.

The flowchart of FIG. 21 is a detailed description of the processing of steps S1521 to S1528 in FIG. 15B. Step S1521 in FIG. 15B corresponds to step S2101 in FIG. 21. Step S1522 in FIG. 15B corresponds to step S2102 in FIG. 21. Step S1523 in FIG. 15B corresponds to step S2103 in FIG. 21. Step S1524 in FIG. 15B corresponds to step S2104 in FIG. 21. Step S1525 in FIG. 15B corresponds to step S2105 in FIG. 21. Step S1526 in FIG. 15B corresponds to step S2106 in FIG. 21. Step S1527 in FIG. 15B corresponds to step S2107 in FIG. 21. Step S1528 in FIG. 15B corresponds to step S2108 in FIG. 21.

Figure 22:
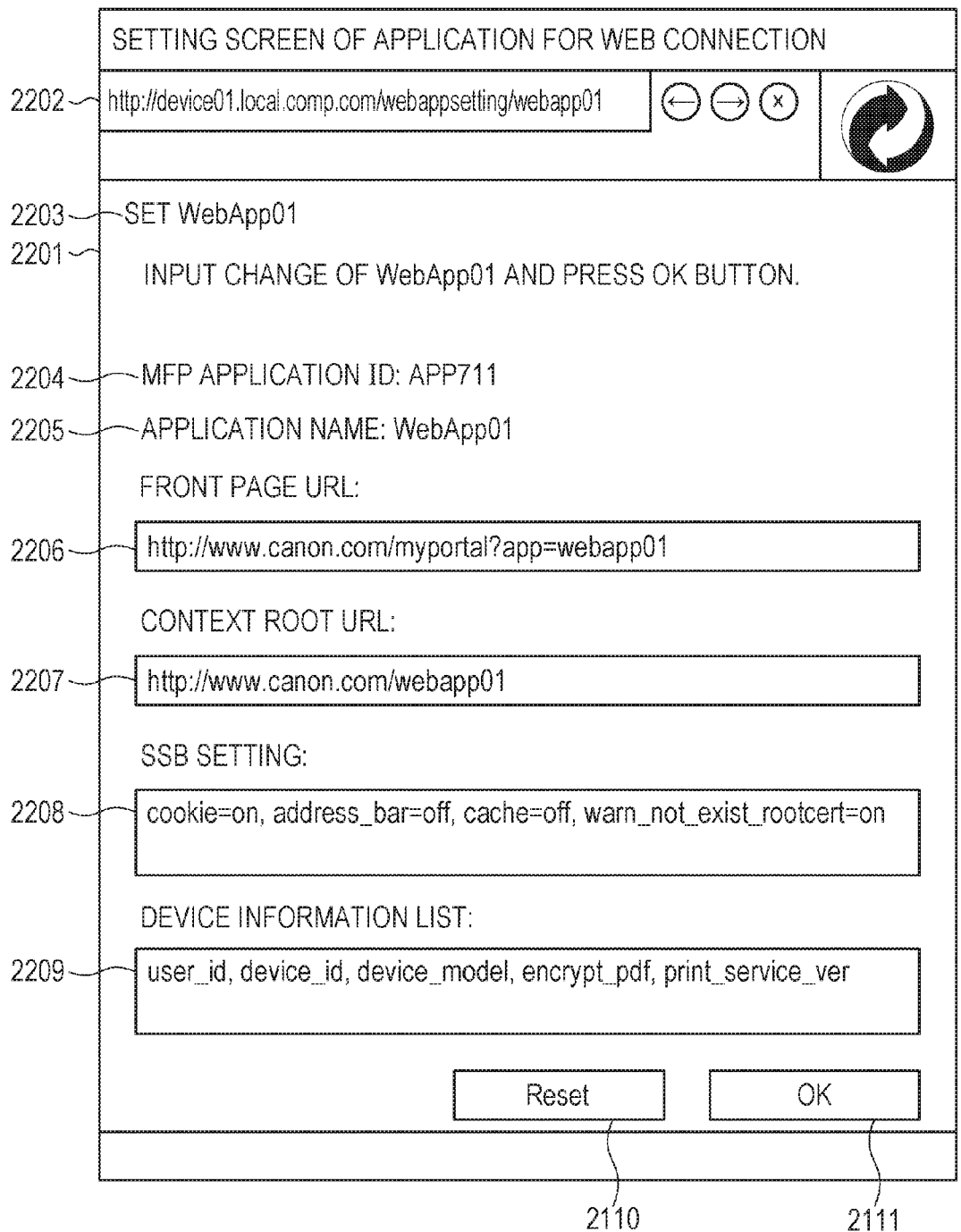
FIG. 22 is a view illustrating an example of a GUI displayed on an operation unit of the PC according to one or more aspects of the present disclosure.

The web browser 601 of the PC 140 accepts a setting screen call-up instruction from the user to the MFP application for web connection 711 of the MFP 110 (step S2101). The web browser 601 requests the setting screen of the MFP application for web connection 711 instructed from the user to the MFP 110 through the communication unit 602 (step S2102). The web browser 601 acquires the setting screen of the MFP application for web connection 711 via the communication unit 602, requests the screen processing unit 603 to display the acquired setting screen, and displays the setting screen (step S2104). Details of the setting screen of the MFP application for web connection 711 will be described with reference to FIG. 22. When an OK button 2111 in FIG. 22 is pressed, the web browser 601 transmits the input contents in a setting screen of application for web connection 2201 as a setting change request to the MFP 110 through the communication unit 602 (step S2106). The web browser 601 receives the setting result of the setting change request for the MFP application for web connection through the communication unit 602 (step S2107). The web browser 601 requests the screen processing unit 603 to display the contents of the setting result received in step S2107, displays the setting result screen (step S2108), and the processing ends.

FIG. 22 is a diagram for describing a setting screen of application for web connection displayed on a display or the like connected to the display unit I/F 307 of the PC 140. FIG. 22 illustrates an example of the setting screen of application for web connection displayed on a display or the like connected to the display unit I/F 307. This screen is displayed on the display connected to the display unit I/F 307 by the CPU 301 executing the web browser 601 on the PC 140. A keyboard, a mouse, or the like connected to the input/output I/F 306 is used for a user's input operation on this screen.

The setting screen of application for web connection 2201 includes a URL of setting screen of application for web connection 2202, a title of setting screen of application for web connection 2203, an MFP application ID display 2204, an application name display 2205, and the like. The setting screen of application for web connection 2201 includes a front page URL input box 2206, a context root URL input box 2207, an SSB setting input box 2208, a device information list input box 2209, and the like. In addition, the setting screen of application for web connection 2201 includes a reset button 2110, the OK button 2111, and the like. In FIG. 22, the front page URL input box 2206, the context root URL input box 2207, the SSB setting input box 2208, and the device information list input box 2209 can receive input, but a configuration may be adopted in which some of the boxes cannot receive input. Although the SSB setting input box 2208 and the device information list input box 2209 receive input in the form of text in FIG. 22, a multiple-choice GUI such as check boxes, radio buttons, or a list box can be adopted in which a user can select from among a plurality of options.

The URL of setting screen of application for web connection 2202 represents the URL of the application for web connection, and the title of setting screen of application for web connection 2203 represents the title of the setting screen of application for web connection. The MFP application ID display 2204 displays the MFP application ID 911 of the manifest file of the MFP application for web connection 711, and the application name display 2205 displays the application name 912 of the manifest file. In the front page URL input box 2206, the front page URL 913 of the manifest file of the MFP application for web connection 711 is initially displayed. The front page URL input box 2206 is an input box for accepting input of a front page URL from the user. In the context root URL input box 2207, the context root URL 914 of the manifest file of the MFP application for web connection 711 is initially displayed. The context root URL input box 2207 is an input box for accepting input of a context root URL from the user. In the SSB setting input box 2208, the SSB setting 915 of the manifest file of the MFP application for web connection 711 is initially displayed. The SSB setting input box 2208 is an input box for accepting input of the SSB setting 915 from the user. In the device information list input box 2209, the device information list 916 of the manifest file of the MFP application for web connection 711 is initially displayed. The device information list input box 2209 is an input box for accepting input of the device information list 916 from the user. The reset button 2110 is a button for accepting an input initialization instruction from the user. When the reset button 2110 is pressed, the input contents on the setting screen of application for web connection 2201 are changed to contents at the time of initial display. The OK button 2111 is a button for accepting a setting contents transmission instruction from the user. When the OK button 2111 is pressed, the web browser 601 transmits the input contents on the setting screen of application for web connection 2201 to the web application server 130.

FIG. 23 is a flowchart for describing processing performed when the manifest file change unit 837 of the MFP application for web connection accepts a manifest file change request from the PC 140. The CPU 201 reads the program stored in the HDD 204 of the MFP 110 into the RAM 203, analyzes and executes the program, whereby the respective steps of the flowchart in FIG. 23 are executed.

The flowchart of FIG. 23 is a detailed description of the processing of step S1527 in FIG. 15B. Step S1527 in FIG. 15B corresponds to steps S2301 to S2310 in FIG. 23.

First, the manifest file change unit 837 of the MFP application for web connection 711 accepts a request for a setting screen of MFP application for web connection from the PC 140 (step S2301). The manifest file change unit 837 determines whether the new manifest file 822 exists in the MFP application for web connection 711 (step S2302). In a case where the new manifest file 822 exists, the manifest file change unit 837 creates the setting screen of application for web connection 2201 of FIG. 22 with the information of the new manifest file 822 (step S2303). In a case where the new manifest file 822 does not exist, on the other hand, the manifest file change unit 837 creates the setting screen of application for web connection 2201 of FIG. 22 with the information of the current manifest file 821 (step S2304). Then, the created setting screen of application for web connection 2201 is transmitted to the PC 140 (step S2305).

Next, the manifest file change unit 837 accepts a setting change request for the MFP application for web connection from the PC 140 (step S2306). The manifest file change unit 837 determines whether the new manifest file 822 exists in the MFP application for web connection 711 (step S2307). In a case where the new manifest file 822 exists, the manifest file change unit 837 overwrites the new manifest file 822 with the setting change contents included in the setting change request received in step S2306 (step S2308). In a case where the new manifest file 822 does not exist, on the other hand, the manifest file change unit 837 creates the new manifest file 822 with the setting change contents included in the setting change request received in step S2306 (step S2309). Then, the manifest file change unit 837 transmits the manifest file creation result to the PC 140 as the setting result of the MFP application for web connection 711 (step S2310), and the processing ends.

In order to prevent execution of an unauthorized job, the service provider 707 preferably does not process a job input request from the unauthorized web application server 130 but accepts a job input request from the authorized web application server 130. According to the above-described procedure, the service provider 707 checks whether the URL of the web application server 130 matches the front page URL 913 or the context root URL 914 of the manifest file of the MFP application for web connection 711. In a case where the URLs match, the service provider 707 determines that the job input request is from the authorized web application server 130, and executes the job. In a case where the URLs do not match, on the other hand, the service provider 707 determines that the job input request is from the unauthorized web application server 130, and can avoid executing the job as an error.

Meanwhile, the URL of the web application server 130 may be changed due to circumstances such as a change in the service name of the web application server 130. This makes it necessary to change the setting of the front page URL 913 or the context root URL 914 of the manifest file in the MFP application for web connection 711 of the MFP 110 according to the URL change of the web application server 130. Note that it is necessary for the device administrator to change the setting of the manifest file of the MFP application for web connection 711 in the MFP 110. However, since the MFP 110 is normally used by ordinary users, it is necessary to make it possible to remotely change the setting at any timing. According to the procedure described above, the device administrator can access the manifest file change unit 837 of the MFP 110 using the PC 140, and remotely change the setting at any timing.

Furthermore, the web application server 130 and the MFP 110 execute a series of processing from the web application processing to the job execution as the life cycle. Therefore, when the device administrator accesses the manifest file change unit 837 of the MFP 110 using the PC 140 and changes the setting at arbitrary timing, the consistency of the processing cannot be secured due to the setting change during the life cycle. For example, in the web application processing, even if the setting is consistent with the setting of the web application server and the processing is successful, the setting may be changed in the course of the life cycle. In that case, when a job is input from the web application server 130 to the service provider 707, the values of the setting contents are changed in the middle, the URL of the web application server 130 does not match the changed setting, and the URL confirmation processing of the service provider 707 fails. In particular, the timing and the number of times of making a job input request from the web application server 130 to the service provider 707 at the end of the life cycle are under the control of the web application server 130. Therefore, it is difficult for the MFP 110 to estimate the timing and the number of times of accepting the job input request from the web application server 130, and to determine the break in the life cycle. For this reason, it is difficult for the MFP 110 to reflect the setting contents changed by the device administrator according to the break in the life cycle by determining the break in the life cycle so that the change does not occur in the middle of the life cycle. However, according to the present embodiment, the setting is reflected at the start of the MFP application for web connection 711 when the next life cycle starts, according to the above-described procedure. By doing this, the setting is reflected at the timing that is highly likely to be a break in the life cycle. Thus, it is possible to reflect the setting contents changed by the device administrator at arbitrary timing, at a timing at which the influence on the life cycle is suppressed.

Second Embodiment

Next, a second embodiment of the present disclosure will be described. In the first embodiment, the setting contents of the MFP application for web connection 711 are reflected at the break in the life cycle corresponding to activation of the MFP application for web connection 711. At this time, there may be a case where the processing takes a certain period of time, such as when the processing of job input to the service provider 707 is performed by batch processing after a certain period of time in the processing of the web application server 130. In such a case, the setting of the application for web connection is changed to a new setting, but there are cases where it is desired to allow input of a job with the previous setting for a certain period. In the present embodiment, the setting of the application for web connection is reflected at the time of activating the application for web connection, but an example of the processing that allows the previous setting for a certain period will be described. Unless otherwise specified, in the present embodiment, the block diagrams, sequence diagrams, flowcharts and processing having the same numbers as those in the first embodiment are the same as the block diagrams, sequence diagrams, flowcharts and processing of the same numbers in the first embodiment respectively.

Software of MFP Application for Web Connection According to Second Embodiment

Figure 8C:
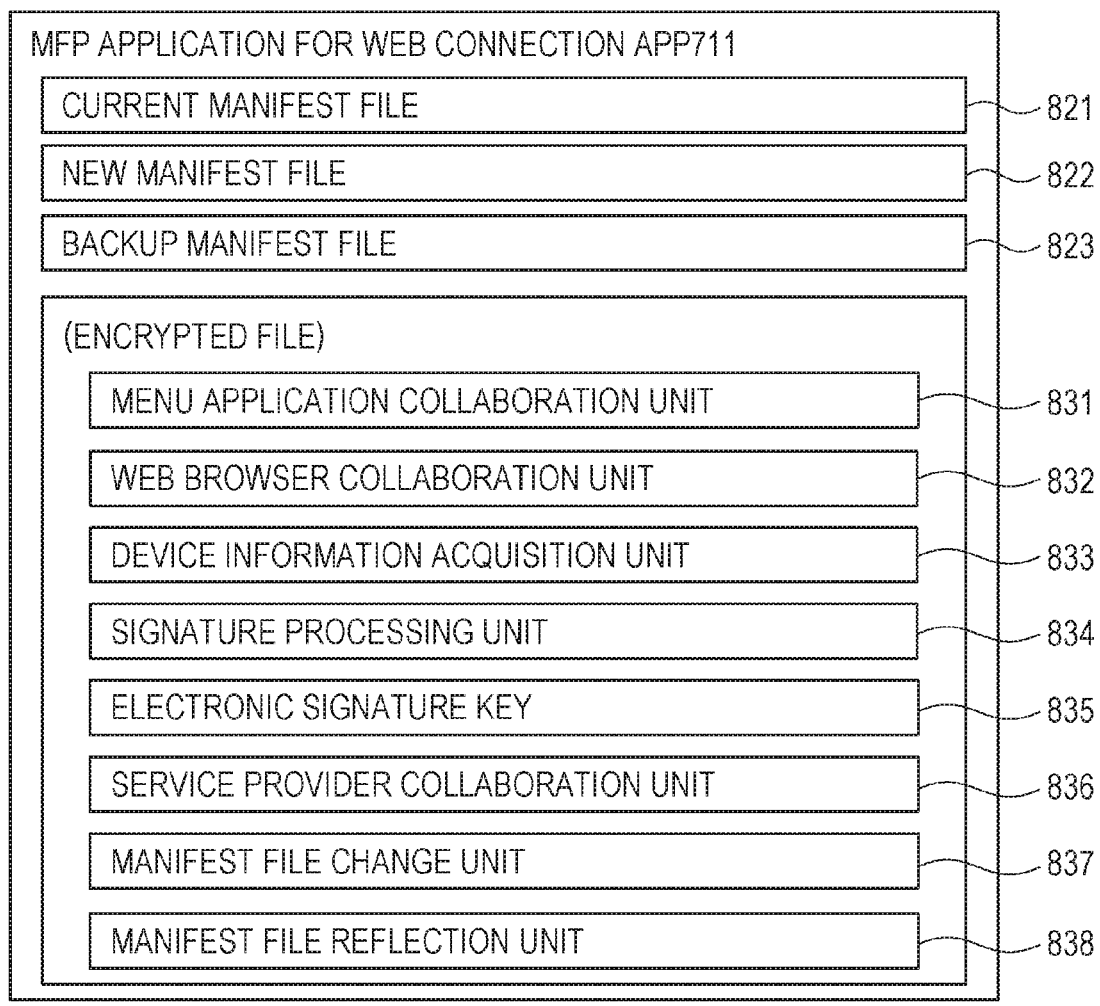

FIG. 8C is a diagram illustrating a configuration of software modules of an MFP application for web connection according to the present embodiment. The MFP application for web connection of FIG. 8B according to the first embodiment holds setting information required for each web application in the current manifest file 821 and the new manifest file 822. In addition to the configuration of FIG. 8B, the MFP application for web connection of FIG. 8C according to the present embodiment holds, as a backup manifest file 823 (i.e., as backup setting), the information before the current manifest file 821 is rewritten with the setting of the new manifest file 822. These software modules illustrated in FIG. 8C are stored in the HDD 204 of the MFP 110, and developed in the RAM 203 and executed by the CPU 201 at the time of execution.

The backup manifest file 823 is a manifest file for holding, as a backup, the information before reflection of the setting of the current manifest file 821 when the changed setting (i.e., the new manifest file 822) is reflected in the current manifest file 821. The backup manifest file 823 is held for a certain period (that is, the period of validity), and when a setting acquisition request is received from the service provider 707, the backup manifest file 823 is returned together with the current manifest file 821 for a certain period, if the backup manifest file 823 exists. Also, in a case where the service provider 707 receives the backup manifest file 823 together with the current manifest file 821 for a certain period, the service provider 707 checks the two manifest files, and if there is no problem, accepts the job. Here, for example, in a case where it is determined that the front page URL or the context root URL included in one of the manifest files matches the URL of the web application server, it is determined that there is no problem. As a result, in the check at the time of receiving a job at the service provider 707, it is also possible to check the setting of the backup manifest file 823 before reflection of the setting, in addition to the current manifest file 821 after reflection of the setting.

Contents of Backup Manifest File

FIG. 9C illustrates an example of a manifest file according to the present embodiment. In FIG. 9C, a grace period 921 and a last update time 922 are defined in addition to the contents of the manifest file in FIG. 9B.

The grace period 921 represents a period during which the backup manifest file 823 is valid. The last update time 922 represents the time at which the backup manifest file 823 has been created. When the service provider 707 accepts a job request from the web application server 130, the setting of the backup manifest file 823 is permitted in addition to the setting of the current manifest file 821 for a period corresponding to the grace period 921 from the last update time 922. For example, in the case of FIG. 9C, the grace period 921 is "4320 min" and the last update time 922 is "Jun. 23, 2016 16:03:05". In this case, it indicates that the backup manifest file 823 is valid for 4320 minutes represented by the grace period 921 starting from 16:03:05 on Jun. 23, 2016 represented by the last update time 922. Here, the value to be set as the grace period 921 will be described. There may be a case where the processing takes a certain period of time, such as when the processing of job input to the service provider 707 is performed by batch processing after a certain period of time in the processing of the web application server 130. In such a case, a time period during which a job may be input to the service provider 707 of the web application server 130, for example, the longest possible time during which the batch processing is performed is set as the grace period 921. Then, even in a case where a job is input from the web application server 130 to the service provider 707 by the batch processing, it is possible for the service provider 707 to perform confirmation processing at the time of a job input request with the previous setting within the time of the grace period 921 from the last update time 922. Note that the last update time 922 is effective only in the backup manifest file 823 in the present embodiment. Therefore, the last update time 922 may be a field unique to the backup manifest file 823. In a case where all the manifest files have the last update time 922, the last update time 922 may not be recorded and may be set as an empty field in the manifest files other than the backup manifest file 823.

Updating Manifest File

FIG. 17B is a flowchart illustrating a processing procedure performed when the MFP application for web connection reflects the setting contents of the new manifest file in the contents of the current manifest file according to the present embodiment. FIG. 17B is a flowchart for describing the processing of storing the backup manifest file in addition to the processing of reflecting the setting contents of the new manifest file in the contents of the current manifest file by the MFP application for web connection in FIG. 17A. The CPU 201 reads the program stored in the HDD 204 of the MFP 110 into the RAM 203, analyzes and executes the program, whereby the respective steps of the flowchart in FIG. 17B are executed. Among the processing in FIG. 17B, the processing having the same numbers as those in FIG. 17A is the same as the processing in FIG. 17A. The flowchart of FIG. 17B is a detailed description of the processing of step S1602 in FIG. 16 in the present embodiment. Step S1602 in FIG. 16 corresponds to steps S1701 to S1703 and steps S1711 to S1714 in FIG. 17B.

In a case where the new manifest file 822 exists in the MFP application for web connection 711, the manifest file reflection unit 838 determines whether the backup manifest file 823 also exists (step S1711). In a case where the backup manifest file 823 exists, the backup manifest file 823 is overwritten with the contents of the current manifest file 821 (step S1712). In a case where there is no backup manifest file

823, on the other hand, the backup manifest file 823 having the copied contents of the current manifest file 821 is created (step S1713). Thereafter, the current manifest file 821 is updated with the contents of the new manifest file 822 (step S1702), and the last update time of the backup manifest file 823 is additionally written to become the current time (step S1714). Thereafter, the new manifest file 822 is deleted (step S1703). In this manner, at the time of updating the contents of the current manifest file 821, the contents immediately before the update are stored as the backup manifest file 823, and the last update time of the backup manifest file 823 is recorded.

Processing of Job by Service Provider

Figure 19B:
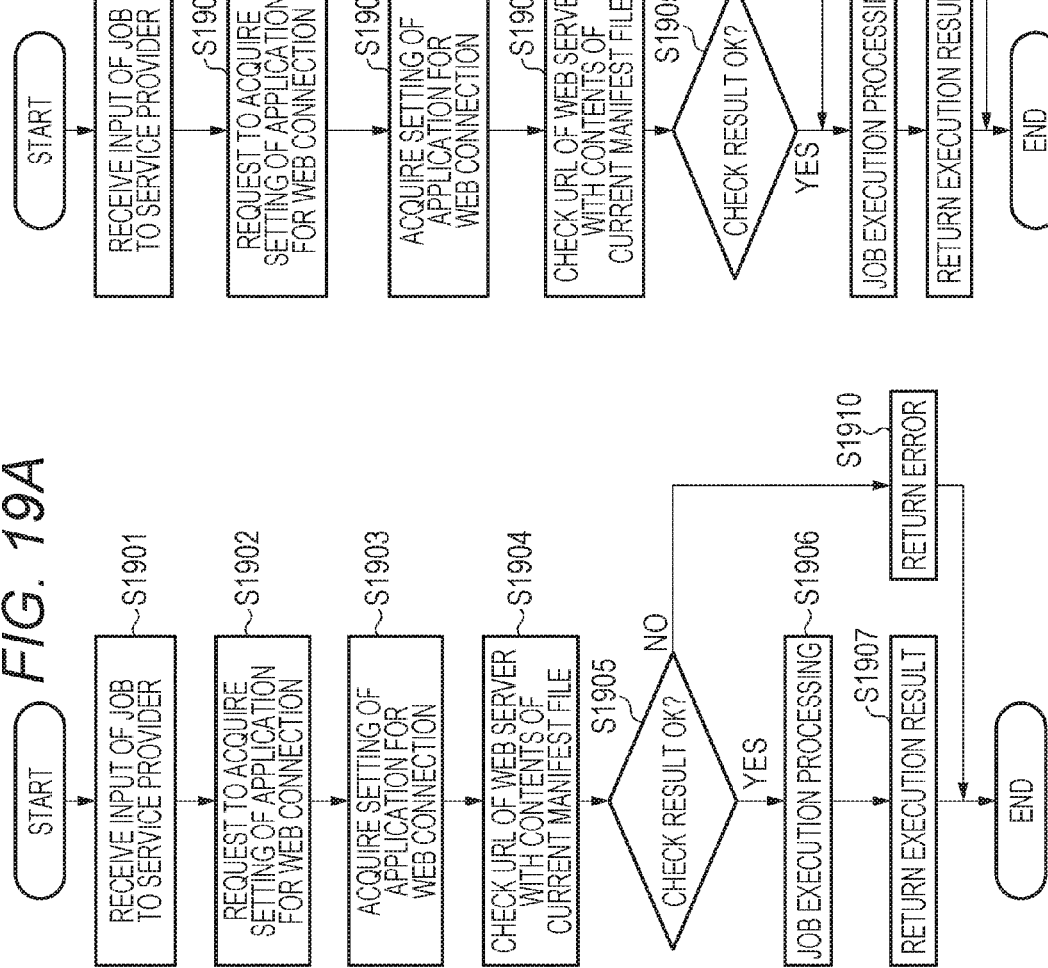

FIG. 19B is a flowchart illustrating a processing procedure performed by the service provider 707 of the MFP 110 in response to a request from the web application server 130 in the present embodiment. FIG. 19B is a flowchart for describing processing performed when the backup manifest file 823 is acquired, in addition to job input processing performed by the service provider 707 of the MFP 110 illustrated in FIG. 19A in response to a request from the web application server 130. The CPU 201 reads the program stored in the HDD 204 of the MFP 110 into the RAM 203, analyzes and executes the program, whereby the respective steps of the flowchart in FIG. 19B are executed. Among the processing in FIG. 19B, the processing having the same numbers as those in FIG. 19A is the same as the processing in FIG. 19A. The flowchart of FIG. 19B is a detailed description of the processing of steps S1512 to S1514 in FIG. 15A. Step S1512 in FIG. 15A corresponds to step S1901 in FIG. 19B. Step S1513 in FIG. 15A corresponds to steps S1902 to S1906 and steps S1921 to S1923 in FIG. 19B. Step S1514 in FIG. 15A corresponds to steps S1907 and S1910 in FIG. 19B. In the following description, FIG. 19B will be described focusing on the difference from FIG. 19A.

In step S1903, the backup manifest file 823 is acquired in addition to the current manifest file 821 from the MFP application for web connection 711, during the grace period from the last update time of the backup manifest file 823. In a case where it is determined that there is no problem as a result of checking the contents of the job received from the web application server 130 using the current manifest file 821 in step S1904, the processing proceeds to step S1921 from step S1905.

The service provider 707 determines whether the backup manifest file 823 has been received in step S1903 from the service provider collaboration unit 836 of the MFP application for web connection 711 (step S1921). The service provider 707 checks the contents of the backup manifest file 823 and the contents of the job input obtained in step S1901 (step S1922).

The service provider 707 determines whether a part of the URL of the web application server 130 that has requested the input of a job matches a part of the context root URL 914 of the backup manifest file 823 (step S1923). In a case where the parts match, that is, if it is determined that there is no problem with the check result in step S1922, the processing proceeds to step S1906 to execute the job, and if it is determined that there is a problem, the processing proceeds to step S1910.

Here, details of the processing in step S1922 will be described. In step S1922, it is confirmed whether the domains and first directories each match between the URL of the web application server 130 and the front page URL 913 or the context root URL 914 of the backup manifest file 823. That is, the "part" in the description of step S1923 corresponds to the domain and the first directory. This URL confirmation processing is similar to the URL confirmation processing in step 1904 of FIG. 19A between the URL of the web application server 130 and the front page URL 913 or the context root URL 914 of the current manifest file 821. That is, among the URL confirmation processing in step 1904, the part related to the current manifest file 821 is replaced with the part related to the backup manifest file 823. Details of the confirmation processing are similar to those in step S1904, and thus a detailed description of the processing is omitted. The purpose of comparing the web application server 130 with the front page URL 913 and the context root URL 914 of the backup manifest file 823 is to allow the service provider 707 to accept job input even with the setting before the grace period.

As a result, even if the URL confirmation referring to the current manifest file 821 fails, as long as the URL confirmation referring to the backup manifest file 823 is successful, the processing is continued assuming that the URL confirmation is successful.

Figure 20B:
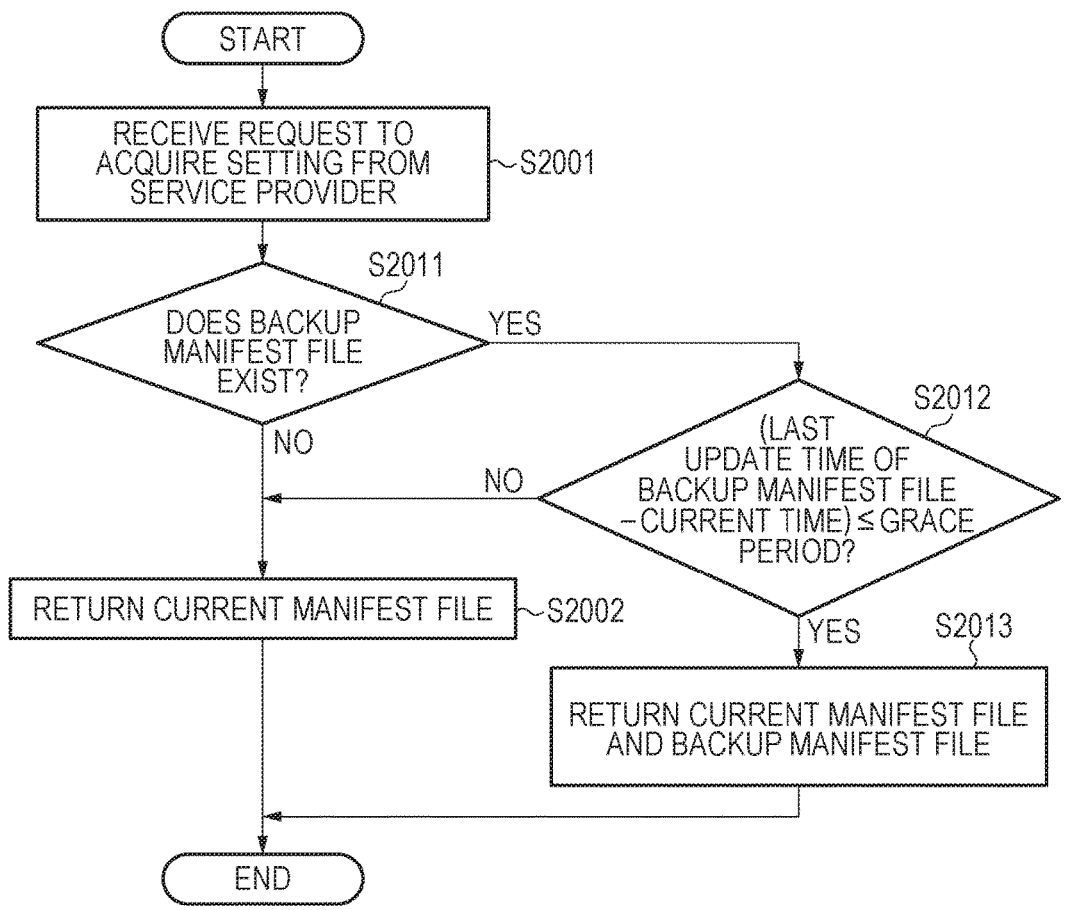

FIG. 20B is a flowchart illustrating processing in which the service provider collaboration unit 836 in the present embodiment returns the current manifest file 821 in response to a request from the service provider 707. FIG. 20B is a flowchart for describing processing in which the service provider collaboration unit 836 returns the backup manifest file 823, in addition to the processing of returning the current manifest file 821 in response to the request from the service provider 707 illustrated in FIG. 20A. The CPU 201 reads the program stored in the HDD 204 of the MFP 110 into the RAM 203, analyzes and executes the program, whereby the respective steps of the flowchart in FIG. 20B are executed. Among the processing in FIG. 20B, the processing having the same numbers as those in FIG. 20A is the same as the processing in FIG. 20A. In the following description, FIG. 20B will be described focusing on the difference from FIG. 20A.

Upon receiving a request for a manifest file from the service provider 707, the service provider collaboration unit 836 determines whether the backup manifest file 823 exists in the MFP application for web connection 711 (step S2011). In a case where the service provider collaboration unit 836 determines that the backup manifest file 823 exists, the processing proceeds to step S2012, and if the backup manifest file 823 does not exist, the processing proceeds to step S2002. In step S2012, the service provider collaboration unit 836 checks whether the backup manifest file 823 of the MFP application for web connection is within the grace period. That is, the service provider collaboration unit 836 checks whether the value of (the last update time 922 of the backup manifest file 823 of the MFP application for web connection—the current time) is equal to or less than the value of the grace period 921. For example, it is assumed that the backup manifest file 823 is as illustrated in FIG. 9C. In a case where the current time is 12:01:02 on Jun. 22, 2016, the value of (the last update time 922 of the backup manifest file 823 of the MFP application for web connection—the current time) is one day, four hours, two minutes and three seconds, that is, 1682 minutes and three seconds. In this case, since the resultant value is less than the value 4320 minutes as the grace period 921, the processing proceeds to step S2013. In this manner, in a case where a predetermined period of time has not elapsed since the backup manifest file is stored, the setting of the backup manifest file is handled as valid.

Next, in a case where it is determined in step S2012 that the backup manifest file is valid, the service provider collaboration unit 836 returns the current manifest file 821 and the backup manifest file 823 to the service provider 707 (step S2013), and the processing ends. In a case where it is determined that the backup manifest file is not valid, only the current manifest file is returned (step S2002). As a result, in a case where the service provider 707 has a problem with the check in the current manifest file 821 in steps S1921 to S1923 in FIG. 19B, the service provider 707 checks the backup manifest file 823.

According to the procedure described above, the current manifest file 821 is held as the backup manifest file 823 in the setting reflection processing immediately after the start of the MFP application for web connection 711. In a case where the service provider 707 issues an error in checking the URL of the current manifest file 821 during the URL confirmation processing at the time of accepting the job input request, the service provider 707 checks the URL of the backup manifest file 823 if it is within the grace period. Also in a case where the URL matches the URL of the backup manifest file 823, the job can be executed. Therefore, for example, a time period during which a job may be input to the service provider 707 of the web application server 130, such as the longest possible time during which the batch processing is performed, is set as the grace period. Then, even in a case where a job is input from the web application server 130 to the service provider 707 by the batch processing, it is possible for the service provider 707 to perform confirmation processing at the time of a job input request with the previous setting within the grace period. Therefore, according to the present embodiment, there may be a case where the processing takes a certain period of time, such as when the processing of job input to the service provider 707 is performed by batch processing after a certain period of time in the processing of the web application server 130. In such a case, the setting of the application for web connection is changed to a new setting, but it is possible to allow input of a job with the previous setting for a certain period. For example, it is possible to accept a request for a job from a web application server having a URL before change within a grace period.

Other Embodiments

The present disclosure can also be implemented by processing in which a program that implements one or more of the functions of the above embodiments is supplied to a system or an apparatus via a network or a storage medium, and one or more processors in a computer of the system or apparatus reads and executes the program. The present disclosure can also be implemented by a circuit (e.g., ASIC) that implements one or more of the functions.

According to the above-described embodiments, even in a case where the web application and the image processing apparatus cooperate to achieve a series of processing, setting inconsistency in the series of processing can be prevented by allowing setting change at appropriate timing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-166013, filed Aug. 26, 2016, which is hereby incorporated by reference herein in its entirety.

What is claimed is:

1. An information processing apparatus having a web browser, comprising:

one or more processors; and one or more memories storing instructions, when executed by the one or more processors, causing the information processing apparatus to function as:

an update unit configured to update a setting related to a web application with a new setting in response to an instruction to access the web application;

an access unit configured to access, in response to the instruction, an access destination included in the setting updated by the update unit using the web browser;

a determination unit configured to determine, in response to a service request, whether the access destination included in the setting related to the web application matches a sender of the service request; and a providing unit configured to provide a service in response to the service request in a case where the determination unit determines that the access destination matches the sender, wherein the setting includes a current setting and a new setting, the information processing apparatus further provides the current setting to an external device in response to a request from the external device and to store, as the new setting, a changed setting received from the external device, in a case where there is the new setting, the update unit updates the setting by rewriting the current setting with the new setting and deletes the new setting after updating the setting, and in a case where the access destination included in the current setting related to the web application matches the sender of the request, the determination unit determines that the access destination included in the setting matches the sender of the request.

2. The information processing apparatus according to claim 1,
wherein the setting further includes a backup setting,
the update unit rewrites the current setting with the new setting after storing the current setting as the backup setting, and
also in a case where the access destination included in the backup setting related to the web application matches the sender of the request, the determination unit determines, for a predetermined period after the backup setting is stored, that the access destination included in the setting matches the sender of the request.

3. The information processing apparatus according to claim 2,
wherein the backup setting includes a last update time at which the backup setting has been stored and a grace period for the backup setting, and
the predetermined period after the backup setting is stored is based on the last update time and the grace period.

4. The information processing apparatus according to claim 1, further comprising:
a scanner; and
a printer,
wherein the providing unit provides, as the service, a service using at least one of the scanner and the printer.

5. The information processing apparatus according to claim 1,
wherein the update unit and the access unit are implemented by an application for web connection associated with a specific web application, and
the setting is stored in association with the application for web connection.

6. The information processing apparatus according to claim 1, further comprising a user interface unit configured to accept the instruction to access the web application.

7. An information processing system comprising:
an image forming apparatus comprising:
a server configured to provide a web application; and
an information processing apparatus configured to function as an external device,
wherein the image processing apparatus comprises:
one or more processors; and
one or more memories storing instructions, when executed by the one or more processors, causing the information processing apparatus to function as:
an update unit configured to update a setting related to a web application with a new setting in response to an instruction to access the web application; and
an access unit configured to access, in response to the instruction, an access destination included in the setting updated by the update unit using the web browser;
a determination unit configured to determine, in response to a service request, whether the access destination included in the setting related to the web application matches a sender of the service request; and
a providing unit configured to provide a service in response to the service request in a case where the determination unit determines that the access destination matches the sender,
wherein the setting includes a current setting and a new setting,
the information processing apparatus further provides the current setting to an external device in response to a request from the external device and to store, as the new setting, a changed setting received from the external device,
in a case where there is the new setting, the update unit updates the setting by rewriting the current setting with the new setting and deletes the new setting after updating the setting, and
in a case where the access destination included in the current setting related to the web application matches the sender of the request, the determination unit determines that the access destination included in the setting matches the sender of the request.

8. A control method for an information processing apparatus having a web browser, the control method comprising:
updating a setting related to a web application with a new setting in response to an instruction to access the web application; and
accessing, in response to the instruction, an access destination included in the setting updated in the updating using the web browser;
determining, in response to a service request, whether the access destination included in the setting related to the web application matches a sender of the service request; and
providing a service in response to the service request in a case where the determination unit determines that the access destination matches the sender,
wherein the setting includes a current setting and a new setting,
the information processing apparatus further providing the current setting to an external device in response to a request from the external device and to store, as the new setting, a changed setting received from the external device,
in a case where there is the new setting, the update unit updates the setting by rewriting the current setting with the new setting and deletes the new setting after updating the setting, and
in a case where the access destination included in the current setting related to the web application matches the sender of the request, the determination unit determines that the access destination included in the setting matches the sender of the request.

9. A non-transitory computer-readable storage medium storing a program that causes a computer to function as:
an update unit configured to update a setting related to a web application with a new setting in response to an instruction to access the web application; and
an access unit configured to access, in response to the instruction, an access destination included in the setting updated by the update unit using a web browser;
a determination unit configured to determine, in response to a service request, whether the access destination included in the setting related to the web application matches a sender of the service request; and
a providing unit configured to provide a service in response to the service request in a case where the determination unit determines that the access destination matches the sender,
wherein the setting includes a current setting and a new setting,
the information processing apparatus further provides the current setting to an external device in response to a request from the external device and to store, as the new setting, a changed setting received from the external device,
in a case where there is the new setting, the update unit updates the setting by rewriting the current setting with the new setting and deletes the new setting after updating the setting, and in a case where the access destination included in the current setting related to the web application matches the sender of the request, the determination unit determines that the access destination included in the setting matches the sender of the request.

* * * * *